US012718462B2

(12) United States Patent
Hu

(10) Patent No.: US 12,718,462 B2
(45) Date of Patent: Aug. 25, 2026

(54) OBJECT PROCESSING METHOD AND APPARATUS, DEVICE, COMPUTER-READABLE STORAGE MEDIUM, AND COMPUTER PROGRAM PRODUCT

(71) Applicant: Tencent Technology (Shenzhen) Company Limited, Shenzhen (CN)

(72) Inventor: Kaimo Hu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 402 days.

(21) Appl. No.: 18/435,778

(22) Filed: Feb. 7, 2024

(65) Prior Publication Data

US 2024/0177396 A1 May 30, 2024

Related U.S. Application Data

(63) Continuation of application No. PCT/CN2023/089104, filed on Apr. 19, 2023.

(30) Foreign Application Priority Data

Jun. 17, 2022 (CN) ........................ 202210684708.8

(51) Int. Cl.
*G06T 15/04* (2011.01)
*G06T 15/00* (2011.01)

(52) U.S. Cl.
CPC ............ *G06T 15/04* (2013.01); *G06T 15/005* (2013.01)

(58) Field of Classification Search
None
See application file for complete search history.

(56) References Cited

U.S. PATENT DOCUMENTS

2002/0083314 A1 6/2002 Uyttendaele et al.
2003/0206165 A1* 11/2003 Hoppe .................... G06T 17/20
345/420

(Continued)

FOREIGN PATENT DOCUMENTS

CN 104504469 A 4/2015
CN 113791914 A 12/2021

(Continued)

OTHER PUBLICATIONS

Bruno Lévy, Sylvain Petitjean, Nicolas Ray, Jérome Maillot, "Least Squares Conformal Maps for Automatic Texture Atlas Generation", Jul. 1, 2002, ACM Transactions on Graphics (TOG), vol. 21, Issue 3, pp. 362-371.*

T. Nöll, D. Strieker, "Efficient Packing of Arbitrary Shaped Charts for Automatic Texture Atlas Generation", Jul. 19, 2011, Blackwell Publishing, Computer Graphics Forum, vol. 30, No. 4, pp. 1310-1317.*

(Continued)

*Primary Examiner* — Robert Bader
(74) *Attorney, Agent, or Firm* — Morgan, Lewis & Bockius LLP

(57) ABSTRACT

This application provides a map rendering method performed by a computer device. The method includes: obtaining an initial filling result of a plurality of resource objects in a target container; moving, based on the initial filling result, at least one resource object to a center location of an available space corresponding to the resource object in the target container; obtaining symmetry attribute information and inclusion relationship information of the at least one resource object; determining an extension type of the at least one resource object based on the symmetry attribute information and the inclusion relationship information of the at least one resource object; and extending the at least one resource object in the target container based on the extension type of the at least one resource object.

20 Claims, 15 Drawing Sheets

(56) References Cited

U.S. PATENT DOCUMENTS

| | | | | |
|---|---|---|---|---|
| 2005/0151733 | A1* | 7/2005 | Sander | G06T 17/20<br>345/423 |
| 2015/0160979 | A1 | 6/2015 | Moffitt | |
| 2017/0221263 | A1* | 8/2017 | Wei | G06T 11/10 |
| 2018/0075641 | A1* | 3/2018 | Ceylan | G06T 11/10 |
| 2020/0219286 | A1* | 7/2020 | Sinharoy | G06T 7/174 |
| 2021/0241510 | A1* | 8/2021 | Kuribayashi | G06T 15/04 |
| 2022/0405999 | A1* | 12/2022 | Lu | G06T 15/04 |
| 2022/0414986 | A1* | 12/2022 | Bouny | G06T 7/12 |
| 2023/0171427 | A1* | 6/2023 | Bachhuber | H04N 19/177<br>375/240.12 |

FOREIGN PATENT DOCUMENTS

| | | |
|---|---|---|
| CN | 113920184 A | 1/2022 |
| CN | 114255160 A | 3/2022 |
| CN | 114781014 A | 7/2022 |

OTHER PUBLICATIONS

Jarkko Pöyry, “Irregular Packing for Mobile Game Texture Atlases”, Aug. 21, 2018, Aalto University, Master’s Thesis.*

Max Limper, Nicholas Vining, Alla Sheffer, “Box Cutter: Atlas Refinement for Efficient Packing via Void Elimination”, Jul. 30, 2018, ACM, ACM Transactions on Graphics (TOG), vol. 37, Issue 4, Article No. 153.*

Jonas Martinez, Carlos Andujar, “Space-Optimized Texture Atlases for 3D Scenes with Per-polygon Textures”, Sep. 27, 2010, IEEE, 2010 18th Pacific Conference on Computer Graphics and Applications, pp. 14-23.*

Andrea Lodi et al., “Recent Advances on Two-Dimensional Bin Packing Problems”, Discrete Applied Mathematics, vol. 123, Iss. 1-3, DOI: 10.1016/S0166-218X(01)00347-X, Nov. 2022, 18 pgs.

Tencent Technology, ISR, PCT/CN2023/089104, Jun. 8, 2023, 2 pgs.

* cited by examiner

OBJECT PROCESSING METHOD AND APPARATUS, DEVICE, COMPUTER-READABLE STORAGE MEDIUM, AND COMPUTER PROGRAM PRODUCT

CROSS-REFERENCE TO RELATED APPLICATIONS

This application is a continuation application of PCT Patent Application No. PCT/CN2023/089104, entitled "OBJECT PROCESSING METHOD AND APPARATUS, DEVICE, COMPUTER-READABLE STORAGE MEDIUM, AND COMPUTER PROGRAM PRODUCT" filed on Apr. 19, 2023, which claims priority to Chinese Patent Application No. 202210684708.8, entitled "OBJECT PROCESSING METHOD AND APPARATUS, DEVICE, COMPUTER-READABLE STORAGE MEDIUM, AND COMPUTER PROGRAM PRODUCT" filed on Jun. 17, 2022, all of which is incorporated herein by reference in its entirety.

FIELD OF THE TECHNOLOGY

This application relates to the field of computer technologies, and in particular, to an object processing method and apparatus, a device, a computer-readable storage medium, and a computer program product.

BACKGROUND OF THE DISCLOSURE

A polygonal model is a most popular, most important, and most widely supported model representation method in computer graphics. A basic process of two-dimensional packing is as follows: Each polygon is sequentially placed into a container according to a specific rule. Each time a polygon is placed, a region available for placement in the container is updated, and then a next polygon is placed until all polygons are placed into the container or the container is full. FIG. 1 shows an intermediate state of the packing process. Unplaced polygons are shown on the left, and placed polygons and remaining space of the container are shown on the right. The packing problem is widely studied in academia, and achievements thereof are also widely used in industry. After a packing result is obtained by using a packing algorithm provided in the related art, a large gap usually exists. Even if further optimization is performed, only some polygons are extended, or all polygons undergo the same type of extension. An increase in a filling rate of packing is limited and cannot surpass effect of manual packing optimization.

SUMMARY

Embodiments of this application provide an object processing method and apparatus, a computer-readable storage medium, and a computer program product, to increase a filling rate of resource objects in a target container.

Technical solutions in the embodiments of this application are implemented as follows:

An embodiment of this application provides a map rendering method performed by a computer device, and the method including:

obtaining an initial filling result of a plurality of resource objects in a target container;

moving, based on the initial filling result, at least one resource object to a center location of an available space corresponding to the resource object in the target container;

obtaining symmetry attribute information and inclusion relationship information of the at least one resource object;

determining an extension type of the at least one resource object based on the symmetry attribute information and the inclusion relationship information of the at least one resource object; and extending the at least one resource object in the target container based on the extension type of the at least one resource object.

An embodiment of this application provides a computer device, including:

a memory, configured to store executable instructions; and a processor, configured to implement the map rendering method provided in the embodiments of this application when executing the executable instructions stored in the memory.

An embodiment of this application provides a non-transitory computer-readable storage medium, having executable instructions stored therein for implementing the map rendering method provided in the embodiments of this application when being executed by a processor of a computer device.

The embodiments of this application have the following beneficial effect:

In the object processing method provided in the embodiments of this application, after the initial filling result of the plurality of resource objects is obtained, global homogenization is first performed based on the initial filling result to move each resource object to a center location of an available space corresponding to the resource object. Then symmetry attribute information and inclusion relationship information of each resource object are obtained, and an extension type of each resource object is determined based on the symmetry attribute information and the inclusion relationship information of the resource object. Finally, extension is performed based on the extension type of each resource object to obtain each processed resource object. Each resource object in the target container is extended, and the resource object is moved to the center location before being extended, so that extension can be performed in limited space at a maximum ratio. In addition, the extension type of the resource object is adaptively determined based on the symmetry attribute information and the inclusion information of the resource object, and the extension type includes the isotropic extension and the anisotropic extension. In the related art, only isotropic extension can be performed on a resource object. In comparison, in the embodiments of this application, isotropic extension is performed on a resource object that supports only isotropic extension, but anisotropic extension is performed on a resource object that supports anisotropic extension, so that the resource object can be extended to the maximum extent. This can simulate effect of manual packing adjustment to maximize a filling rate.

DESCRIPTION OF EMBODIMENTS

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following descriptions, the term “some embodiments” describes subsets of all possible embodiments, but it can be understood that “some embodiments” may be the same subset or different subsets of all the possible embodiments, and can be combined with each other without conflict.

In the following descriptions, the terms “first”, “second”, and “third” are merely intended to distinguish between similar objects rather than describe a specific order of objects. It can be understood that the “first”, “second”, and “third” are interchangeable in order in proper circumstances, so that the embodiments of this application described herein can be implemented in an order other than the order illustrated or described herein.

Unless otherwise defined, meanings of all technical and scientific terms used in this specification are the same as those usually understood by a person skilled in the art to which this application belongs. The terms used in this specification are merely intended to describe the objectives of the embodiments of this application, but are not intended to limit this application.

Before the embodiments of this application are further described in detail, terms in the embodiments of this application are described, and the following explanations are applicable to the terms in the embodiments of this application.

Figure 1:
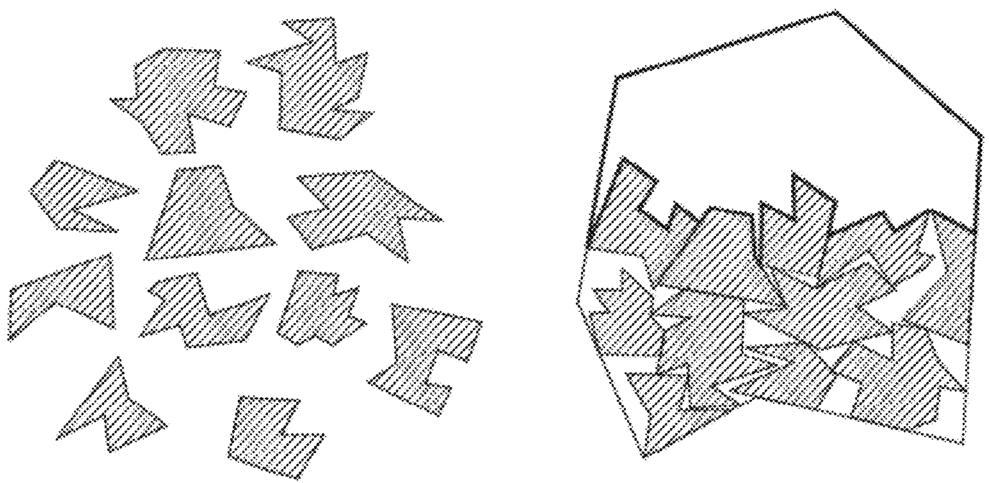
FIG. 1 is a schematic diagram of a packing problem.

1. Packing problem: In a general sense, a packing problem means arranging a group of regular or irregular two-dimensional or three-dimensional objects in a given regular or irregular container according to a specific rule to achieve a specific purpose. A packing problem in the embodiments of this application focuses on packing two-dimensional irregular polygons into a two-dimensional container, as shown in FIG. 1. In art production terms, a to-be-packed two-dimensional irregular polygon is also referred to as a UV island. In the embodiments of this application, a two-dimensional irregular polygon is referred to as a resource object.

2. A no-fit polygon (NFP) is a polygon formed by a trajectory of a reference point on a boundary of a polygon B when the polygon B slides along an inner wall of another polygon A. The NFP defines a feasible region in which the reference point is placed when the polygon B is packed in a region defined by the polygon A.

3. Minkowski sum: A Minkowski sum of given vector sets A and B is defined as $A+B=\{a+b|\in A, b\in B\}$.

4. A genetic algorithm (GM) is a calculation model that simulates natural selection of Darwin’s theory of evolution and a biological evolution process of a genetics mechanism, and is a method for searching for an optimal solution by simulating a natural evolution process. The algorithm converts a problem solving process into a process similar to chromogene crossover, mutation, or the like in biological evolution by using mathematics and computer simulation operations. In the case of solving a complex combinatorial optimization problem, this algorithm usually can quickly achieve a good optimization result compared with some conventional optimization algorithms.

5. An AABB tree is a spatial search tree implemented based on a principle of a K-d tree, and each node represents a spatial bounding box of a three-dimensional geometric primitive. The data structure can quickly report whether a queried primitive intersects with a primitive in the tree, and a specific intersection type and intersection location, and the like.

6. Padding is an art term used in a packing problem and indicates a specific gap reserved for spacing protection between UV islands during packing. Generally, a common practice in UV island packing is to take one pixel out of every 128 pixels as the padding based on a resolution of a packing space. For example, two pixels are usually used as the padding at a resolution of 256×256.

To better understand an object processing method for packing optimization provided in the embodiments of this application, a packing algorithm in the related art is first described.

In the related art, a commonly used packing algorithm is a method based on an NFP and a lowest center of gravity. During implementation, a plurality of candidate angles are sequentially determined for each to-be-placed polygon, a plurality of candidate locations are determined based on the candidate angles, and a corresponding polygon is placed based on a candidate location with a lowest center of gravity. A large gap exists in a container after placement is performed according to this packing method, and therefore a filling rate is low.

In the related art, a solution for performing location optimization on an existing packing result to increase a filling rate is proposed. An overall filling rate of packing is gradually increased by iteratively performing isotropic extension on some UV islands and placing them into larger gaps. In this method, packed UV islands are enlarged in an approximately uniform manner, and their locations are optimized, so that packing effect can be greatly improved. However, this method still cannot maximize a filling rate for two reasons: (1) A UV island can be enlarged at equal ratios only during a location update. This limits extension of a UV island without a location update. (2) This algorithm does not support some UV islands that allow anisotropic extension. This affects a further increase in the filling rate.

Based on this, the embodiments of this application provide an object processing method and apparatus, a computer device, a non-transitory computer-readable storage medium, and a computer program product, to maximize packing utilization while retaining an isotropic/anisotropic feature of a resource object to meet a specific requirement. The following describes exemplary application of a computer device provided in the embodiments of this application. The device provided in the embodiments of this application may be implemented as various types of user terminals, for example, a notebook computer, a tablet computer, a desktop computer, a set-top box, or a mobile device (for example, a mobile phone, a portable music player, a personal digital assistant, a dedicated messaging device, or a portable gaming device), or may be implemented as a server. The following describes exemplary application when the device is implemented as a terminal.

Figure 2:
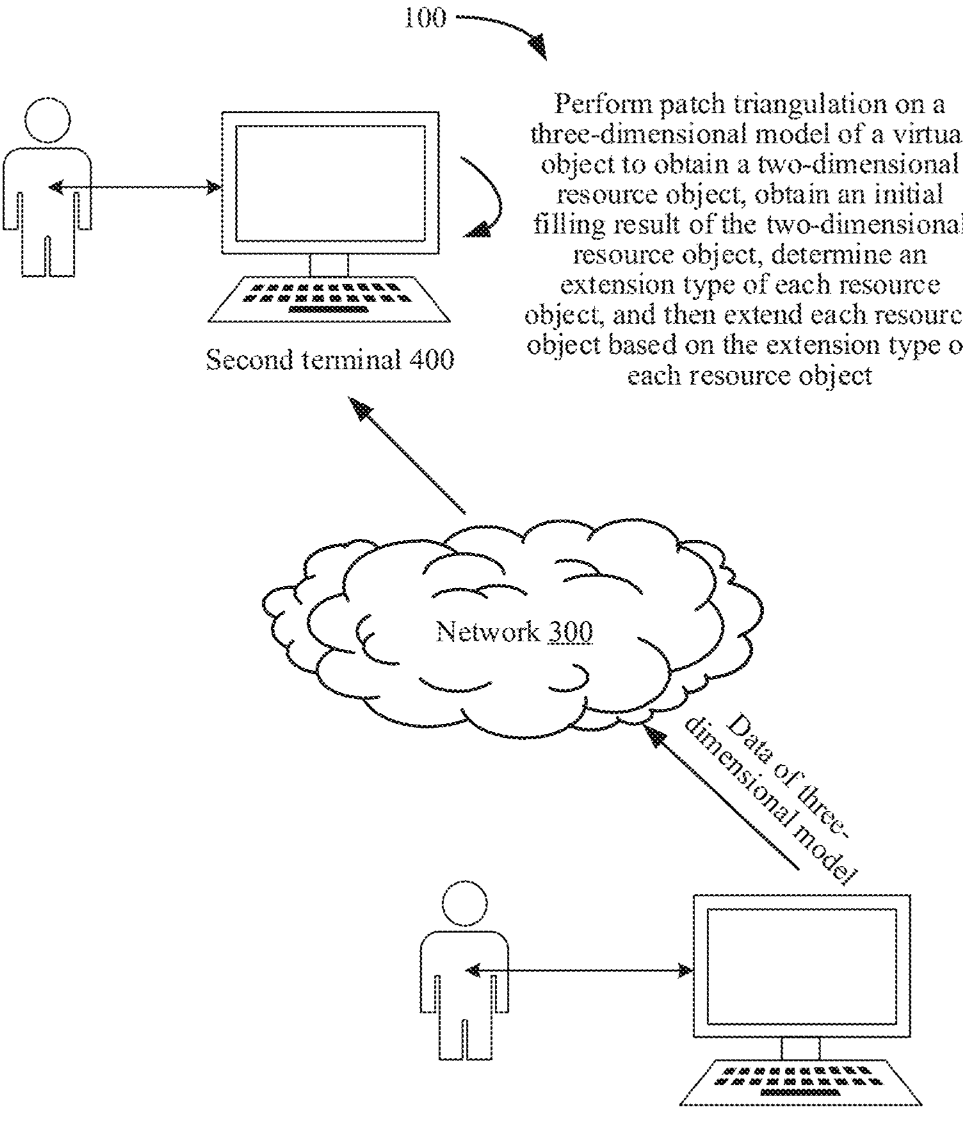
FIG. 2 is a schematic architectural diagram of an object processing system 100 according to an embodiment of this application.

FIG. 2 is a schematic architectural diagram of an object processing system 100 according to an embodiment of this application. As shown in FIG. 2, the system includes a first terminal 200, a network 300, and a second terminal 400. The first terminal 200 and the second terminal 400 establish a communication connection through the network. The network 300 may be a wide area network, a local area network, or a combination thereof.

A user may complete a three-dimensional model design for a virtual object by using the first terminal 200. The virtual object may be a virtual object in a game scene, a virtual object in a virtual reality scene or an augmented reality scene, or a virtual object in an animation. For example, the virtual object may be a virtual character, a virtual building, or a virtual plant. A virtual object displayed in a virtual scene is obtained by performing texture mapping on a three-dimensional model of the virtual object by using a texture mapping technology, so that authenticity and vividness of a virtual object displayed on a game screen can be improved. In this embodiment of this application, after completing the three-dimensional model design for the virtual object, the first terminal 200 transmits three-dimensional model data to the second terminal 400. The second terminal 400 may perform patch triangulation on the three-dimensional model of the virtual object to obtain a two-dimensional resource object (which may be referred to as a UV island or a polygon in some embodiments), and then pack the two-dimensional resource object. During implementation, the two-dimensional resource object may be packed to obtain an initial filling result. The initial filling result may be obtained by packing a plurality of resource objects by using a preset packing algorithm, or may be obtained through further global optimization on a packing result obtained by packing a plurality of resource objects by using a preset packing algorithm. In this embodiment of this application, after the initial filling result is obtained, each resource object is moved, based on the initial filling result, to a center location of an available space corresponding to the resource object. Then an extension type of each resource object is determined based on symmetry attribute information and inclusion relationship information of each resource object, the extension type including one of isotropic extension and anisotropic extension. Then each resource object is extended based on the extension type of each resource object to obtain each processed resource object. A space occupied by a first target object is smaller than a largest gap, and the first target object is enlarged after being moved, so that a total available space of a container is reduced and a filling rate increases.

In some embodiments, the first terminal 200 and the second terminal 400 may be one terminal. To be specific, an object design function and a texture rendering function are completed by one terminal. In some embodiments, the second terminal 400 may alternatively obtain a to-be-rendered three-dimensional virtual object from a server. Then the second terminal 400 performs patch triangulation on the three-dimensional virtual object to obtain a plurality of two-dimensional resource objects, and packs and globally optimizes the plurality of resource objects to increase a filling rate.

The server herein may be an independent physical server, or may be a server cluster or a distributed system that includes a plurality of physical servers, or may be a cloud server that provides basic cloud computing services such as a cloud service, a cloud database, cloud computing, a cloud function, cloud storage, a network service, cloud communication, a middleware service, a domain name service, a security service, a CDN, big data, and an artificial intelligence platform. The first terminal 200 and the second terminal 400 may be a smartphone, a tablet computer, a notebook computer, a desktop computer, a smart speaker, a smartwatch, a vehicle-mounted intelligent terminal, or the like, but is not limited thereto. The terminal and the server may be directly or indirectly connected through wired or wireless communication. This is not limited in the embodiments of this application.

Figures 3, 4A:
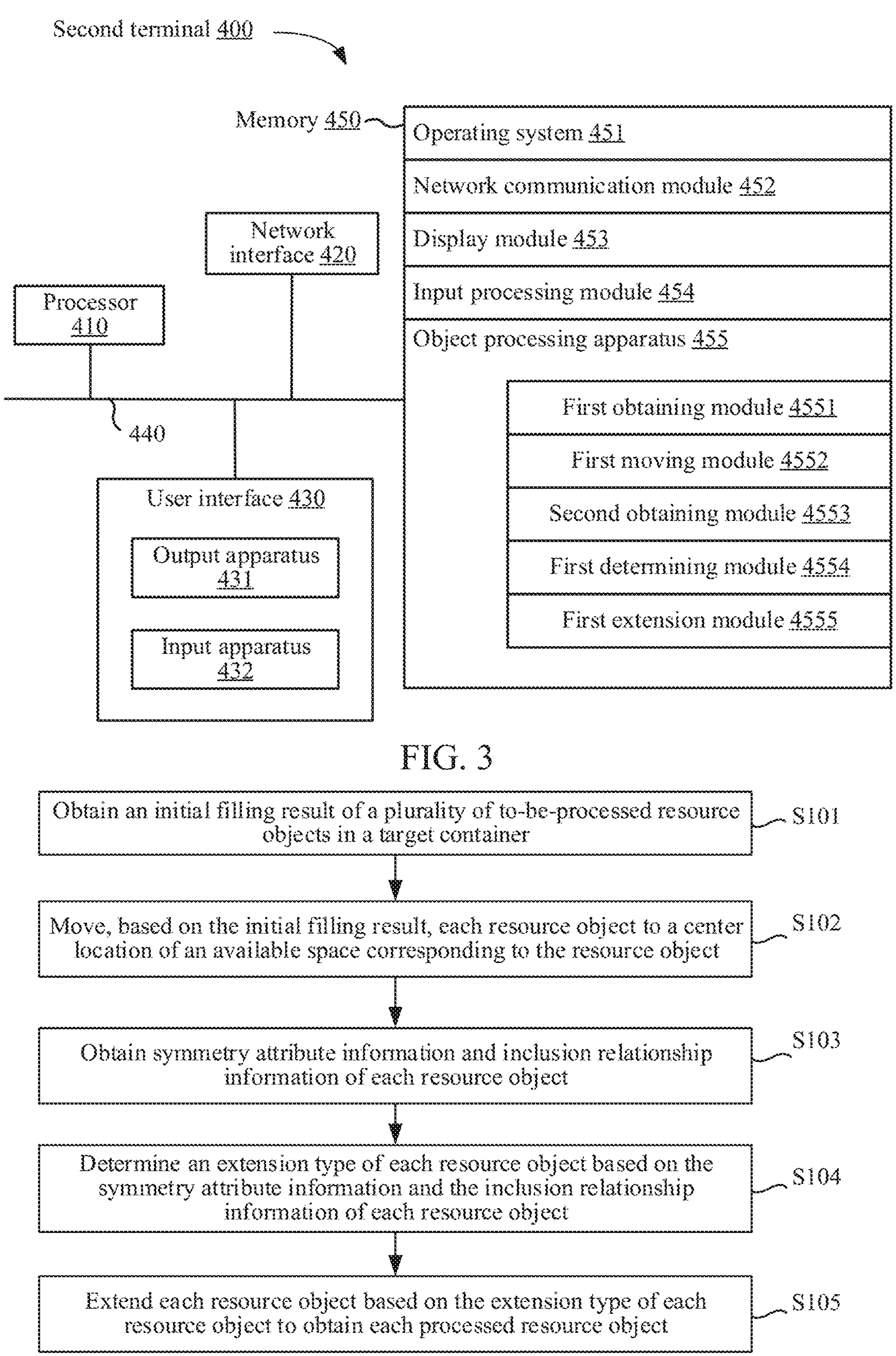
FIG. 3 is a schematic structural diagram of a second terminal 400 according to an embodiment of this application.
FIG. 4A is a schematic implementation flowchart of an object processing method according to an embodiment of this application.

FIG. 3 is a schematic structural diagram of a second terminal 400 according to an embodiment of this application. The second terminal 400 shown in FIG. 3 includes at least one processor 410, a memory 450, at least one network interface 420, and a user interface 430. The components of the terminal 400 are coupled together by using a bus system 440. It can be understood that the bus system 440 is configured to implement connection and communication between the components. In addition to a data bus, the bus system 440 further includes a power bus, a control bus, and a state signal bus. However, for case of clear description, all types of buses in FIG. 3 are marked as the bus system 440.

The processor 410 may be an integrated circuit chip with a signal processing capability, for example, a general-purpose processor, a digital signal processor (DSP), another programmable logic device, a discrete gate or transistor logic device, or a discrete hardware component. The general-purpose processor may be a microprocessor, any conventional processor, or the like.

The user interface 430 includes one or more output apparatuses 431 capable of displaying media content, including one or more speakers and/or one or more visual display screens. The user interface 430 further includes one or more input apparatuses 432, including user interface components for facilitating user input, for example, a keyboard, a mouse, a microphone, a touch display screen, a camera, or another input button or control.

The memory 450 may be a removable memory, a non-removable memory, or a combination thereof. Exemplary hardware devices include a solid-state memory, a hard disk drive, an optical disc drive, and the like. In some embodiments, the memory 450 includes one or more storage devices physically located away from the processor 410.

The memory 450 includes a volatile memory or a non-volatile memory, or may include both a volatile memory and a non-volatile memory. The non-volatile memory may be a read-only memory (ROM). The volatile memory may be a random access memory (RAM). The memory 450 described in this embodiment of this application is intended to include any suitable type of memory.

In some embodiments, the memory 450 is capable of storing data to support various operations. Examples of the data include a program, a module, and a data structure or a subset or superset thereof. Examples are described below:

- an operating system 451, including system programs for processing various basic system services and performing hardware-related tasks, for example, a framework layer, a core library layer, and a driver layer for implementing various basic services and processing hardware-based tasks;
- a network communication module 452, configured to reach another computing device through one or more (wired or wireless) network interfaces 420, exemplary network interfaces 420 including Bluetooth, wireless fidelity (Wi-Fi), universal serial bus (USB), and the like;
- a display module 453, configured to display information by using one or more output apparatuses 431 (for example, a display screen or a speaker) associated with the user interface 430 (for example, a user interface for operating a peripheral device and displaying content and information); and
- an input processing module 454, configured to detect one or more user inputs or interactions from one or more input apparatuses 432 and translate the detected inputs or interactions.

In some embodiments, the apparatus provided in the embodiments of this application may be implemented by using software. FIG. 3 shows an object processing apparatus 455 stored in the memory 450. The object processing apparatus may be software in a form of a program or plug-in, and includes the following software modules: a first obtaining module 4551, a first moving module 4552, a second obtaining module 4553, a first determining module 4554, and a first extension module 4555. These modules are logical modules, and therefore may be flexibly combined or further split based on implemented functions. Functions of the modules are described below.

In some other embodiments, the apparatus provided in the embodiments of this application may be implemented by using hardware. In an example, the apparatus provided in the embodiments of this application may be a processor in a form of a hardware decoding processor, and is programmed to perform the object processing method provided in the embodiments of this application. For example, the processor in the form of the hardware decoding processor may be one or more application-specific integrated circuits (ASICs), DSPs, programmable logic devices (PLDs), complex programmable logic devices (CPLDs), field programmable gate arrays (FPGAs), or other electronic elements.

The object processing method provided in the embodiments of this application is described with reference to the exemplary application and implementation of the terminal provided in the embodiments of this application.

An embodiment of this application provides an object processing method, applied to a computer device. The computer device may be a terminal or a server. In this embodiment of this application, an example in which the computer device is a terminal is used for description. FIG. 4 is a schematic implementation flowchart of an object processing method according to an embodiment of this application. The object processing method provided in this embodiment of this application is described below with reference to FIG. 4A.

Step S101: Obtain an initial filling result of a plurality of resource objects in a target container.

The plurality of resource objects herein may be two or more resource objects. In this embodiment of this application, the resource object may be a two-dimensional polygon (hereinafter referred to as a polygon) obtained through triangulation on a three-dimensional model of a virtual object. The polygon may be a polygon with or without a hole. In some embodiments, the resource object may be a UV island in the game production industry. The UV island is essentially the foregoing polygon. In addition, the resource object may alternatively be obtained by expanding and partitioning an actual object. The target container is used for carrying the resource object, and the target container may also be a polygonal two-dimensional object.

In an example, the initial filling result may be obtained by sequentially adding the plurality of resource objects to the target container by using a preset packing algorithm. For example, a packing algorithm based on an NFP and a genetic algorithm or an automatic packing algorithm based on an NFP and a principle of a lowest center of gravity may be used. Alternatively, the initial filling result may be obtained through global location optimization on a packing result determined by using a preset packing algorithm. The initial filling result may include locations of center points of the resource objects, and may further include location information of outer contour vertices of the resource objects, an available location in the target container, or the like.

Step S102: Move, based on the initial filling result, an object center of each resource object to a center location of an available space corresponding to the resource object.

In some embodiments, movement information for moving an object center of each resource object to a center location of an available space in which an $i^{th}$ resource object is located may be sequentially determined based on the initial filling result, and when determining, based on the movement information, that a movement distance of the $i^{th}$ resource object is greater than a preset distance threshold, an object center of the $i^{th}$ resource object is moved to the center location of the available space.

Step S103: Obtain symmetry attribute information and inclusion relationship information of each resource object.

The symmetry attribute information of the resource object may include bilateral symmetry attribute information and longitudinal symmetry attribute information of the resource object. The bilateral symmetry attribute information may represent whether the resource object is bilaterally symmetric. The longitudinal symmetry attribute information may represent whether the resource object is longitudinally symmetric. In the case of determining whether the resource object is bilaterally symmetric, the resource object is divided into a left part and a right part by using a vertical center line that passes through an object center point of the resource object and that is perpendicular to an x-axis as a division line, and a coincidence rate of the left part and the right part is determined. When the coincidence rate of the two parts is greater than a preset coincidence threshold (for example, 90%), it is determined that the resource object is bilaterally symmetric. An implementation process of determining whether the resource object is longitudinally symmetric is similar to the foregoing process.

The inclusion relationship information of each resource object may include a first object set and a second object set. The first object set includes an object identifier of a resource object included in the resource object. The second object set includes an object identifier of another resource object including the resource object.

During implementation of determining whether the $i^{th}$ resource object includes a $p^{th}$ resource object, information of holes of the $i^{th}$ resource object may be first obtained. In this embodiment of this application, the resource object may be a two-dimensional polygon. When a two-dimensional polygon includes another polygon, the included polygon may be referred to as a hole of the two-dimensional polygon. The information of the holes of the resource object may include names of vertices on the holes, a vertex location, and a connection relationship between vertices. Then a reference point is randomly determined from an outer boundary of the $p^{th}$ resource object, and whether the reference point is located in a hole of the $i^{th}$ resource object is determined. In an example, whether the reference point is located in a hole of the $i^{th}$ resource object may be checked by using a library function provided by the CGAL. In some embodiments, whether the reference point is located in each hole of the $i^{th}$ resource object is sequentially determined. When the reference point is located in none of holes of the $i^{th}$ resource object, it is determined that the reference point is not located in a hole of the $i^{th}$ resource object, and it is determined that the $i^{th}$ resource object does not include the $p^{th}$ resource object. When the reference point is located in a specific hole of the $i^{th}$ resource object, it is determined that the reference point is located in a hole of the $i^{th}$ resource object, and it is determined that the $i^{th}$ resource object includes the $p^{th}$ resource object.

Step S104: Determine an extension type of each resource object based on the symmetry attribute information and the inclusion relationship information of each resource object.

The extension type includes one of isotropic extension and anisotropic extension. The isotropic extension means that the resource object is extended at a same ratio in all directions. The anisotropic extension means that the resource object may be extended at a same ratio or different ratios in different directions.

In some embodiments, whether the resource object has an internal symmetry feature may be first determined. When the resource object does not have an internal symmetry feature, it may be determined that the extension type of the resource object is the isotropic extension, and when the resource object further includes another resource subobject, an extension type of the another resource subobject is also the isotropic extension. When the resource object has an internal symmetry feature, whether the resource object is included in a parent resource object is determined. When the resource object is not included in a parent resource object, it is determined that the extension type of the resource object is the anisotropic extension. When the resource object is included in another parent resource object and an extension type of the parent resource object is the isotropic extension, the extension type of the resource object is also the isotropic extension; or when the extension type of the parent resource object is the anisotropic extension, whether a sibling resource object of the resource object has an internal symmetry feature further needs to be determined. When the sibling resource object has an internal symmetry feature, it is determined that the extension type of the resource object and an extension type of the sibling resource object are the anisotropic extension; or when at least one sibling resource object does not have an internal symmetry feature, it is determined that the extension type of the resource object and an extension type of the sibling resource object are the isotropic extension.

Step S105: Extend each resource object based on the extension type of each resource object to obtain each processed resource object.

In some embodiments, when the extension type of the resource object is the isotropic extension, a first extension ratio for the resource object is first determined. In the case of determining that the resource object does not include another resource subobject, the resource object is extended based on the first extension ratio to obtain an extended resource object. When the resource object includes another resource subobject, an extension type of the another resource subobject is also the isotropic extension. In this case, the resource object and the resource subobject included in the resource object are simultaneously extended based on the first extension ratio. This can avoid overlapping between the resource object and the resource subobject included in the resource object, and can also improve extension efficiency. When the extension type of the resource object is the anisotropic extension, a second extension ratio for the resource object in each extension direction is determined. When the resource object does not include another resource subobject, the resource object is extended in each extension direction based on a corresponding second extension ratio. When the resource object includes another resource subobject and an extension type of the another resource subobject is also the anisotropic extension, the resource object and the resource subobject are simultaneously extended in each extension direction based on a corresponding second extension ratio, to increase an extension ratio. When the extension type of the resource subobject included in the resource object is not the anisotropic extension, the resource object and the resource subobject cannot be simultaneously extended, to avoid overlapping between the resource object and the resource subobject.

In the object processing method provided in this embodiment of this application, after the initial filling result of the plurality of resource objects is obtained, global homogenization is first performed based on the initial filling result to move each resource object to a center location of an available space corresponding to the resource object. Then symmetry attribute information and inclusion relationship information of each resource object are obtained, and an extension type of each resource object is determined based on the symmetry attribute information and the inclusion relationship information of the resource object. Finally, extension is performed based on the extension type of each resource object to obtain each processed resource object. Each resource object in the target container is extended, and the resource object is moved to the center location before being extended, so that extension can be performed in limited space at a maximum ratio. In addition, the extension type of the resource object is adaptively determined based on the symmetry attribute information and the inclusion information of the resource object, and the extension type includes the isotropic extension and the anisotropic extension. In the related art, only isotropic extension can be performed on a resource object. In comparison, in this embodiment of this application, isotropic extension is performed on a resource object that supports only isotropic extension, but anisotropic extension is performed on a resource object that supports anisotropic extension, so that the resource object can be extended to the maximum extent. This can simulate effect of manual packing adjustment to maximize a filling rate.

Figure 4B:
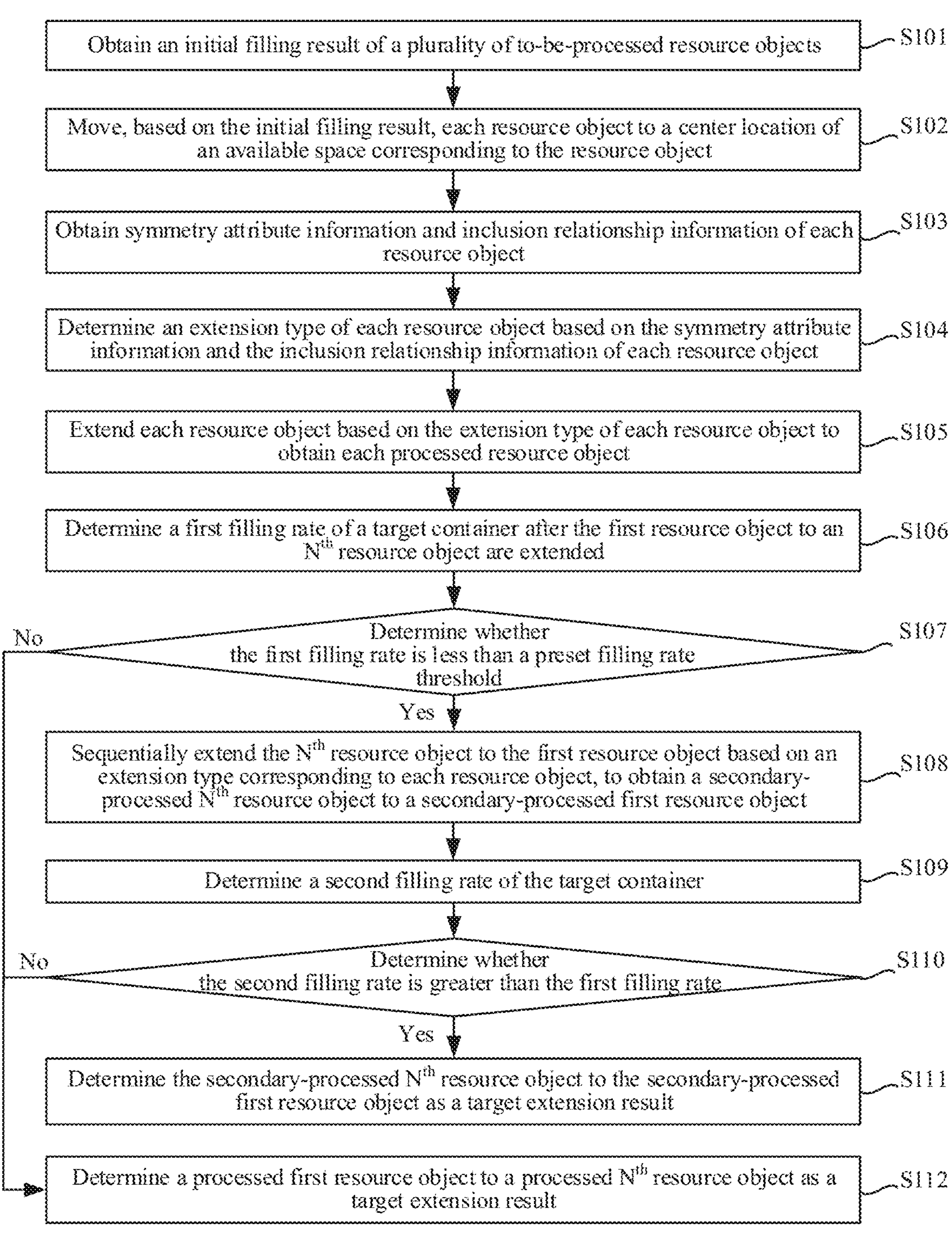
FIG. 4B is another schematic implementation flowchart of an object processing method according to an embodiment of this application.

In some embodiments, after step S105, to further determine whether an extension result obtained in step S105 meets an expected filling rate and whether a better extension result exists, the following step S106 to step S112 may be further performed, as shown in FIG. 4B:

Step S106: Determine a first filling rate of the target container after the first resource object to an $N^{th}$ resource object are extended.

In step S105, the first resource object to the $N^{th}$ resource object are extended in ascending order of identifiers of the resource objects. After the extension, the first filling rate of the target container may be determined based on a total capacity of the target container and a space occupied by each extended resource object. To be specific, spaces occupied by all resource objects are summed to obtain a total occupied space, and then the total occupied space is divided by the total capacity of the target container to obtain the first filling rate.

Step S107: Determine whether the first filling rate is less than a preset filling rate threshold.

In the case of determining that the first filling rate is less than the preset filling rate threshold, step S108 is performed. In the case of determining that the first filling rate is greater than or equal to the filling rate threshold, it indicates that expected extension effect is achieved, and in this case, step S112 is performed.

Step S108: Sequentially extend the $N^{th}$ resource object to the first resource object based on an extension type corresponding to each resource object, to obtain a secondary-processed $N^{th}$ resource object to a secondary-processed first resource object.

In this step, the resource objects in the initial filling result are sorted in descending order, and the $N^{th}$ resource object to the first resource object are sequentially extended based on the extension type object corresponding to each of the $N^{th}$ resource object to the first resource object, to obtain the secondary-processed $N^{th}$ resource object to the secondary-processed first resource object.

In the case of extending the resource objects in descending order, an extension process for a single resource object is similar to that in the implementation of extending the resource objects in ascending order, except that a processing order varies.

Step S109: Determine a second filling rate of the target container.

An implementation process of step S109 is similar to the implementation process of determining the first filling rate in step S106. During implementation of step S109, refer to the implementation process of step S106.

Step S110: Determine whether the second filling rate is greater than the first filling rate.

When the second filling rate is greater than the first filling rate, it indicates that a filling rate of the target container is increased through re-extension in step S108, and in this case, step S111 is performed. When the second filling rate is less than or equal to the first filling rate, it indicates that a filling rate of the target container is not increased through re-extension in step S108, and in this case, step S112 is performed.

Step S111: Determine the secondary-processed $N^{th}$ resource object to the secondary-processed first resource object as a target extension result.

Step S112: Determine a processed first resource object to a processed $N^{th}$ resource object as a target extension result.

In this embodiment of this application, after the resource objects in the target container are extended in ascending order, in step S106 to step S112, when determining that the first filling rate of the target container does not reach the preset filling rate threshold, the resource objects in the target container are extended in descending order to obtain the second filling rate. Finally, an extension result corresponding to a larger one of the first filling rate and the second filling rate is determined as the target extension result, so that a filling rate of the target container can be further increased.

Figure 5:
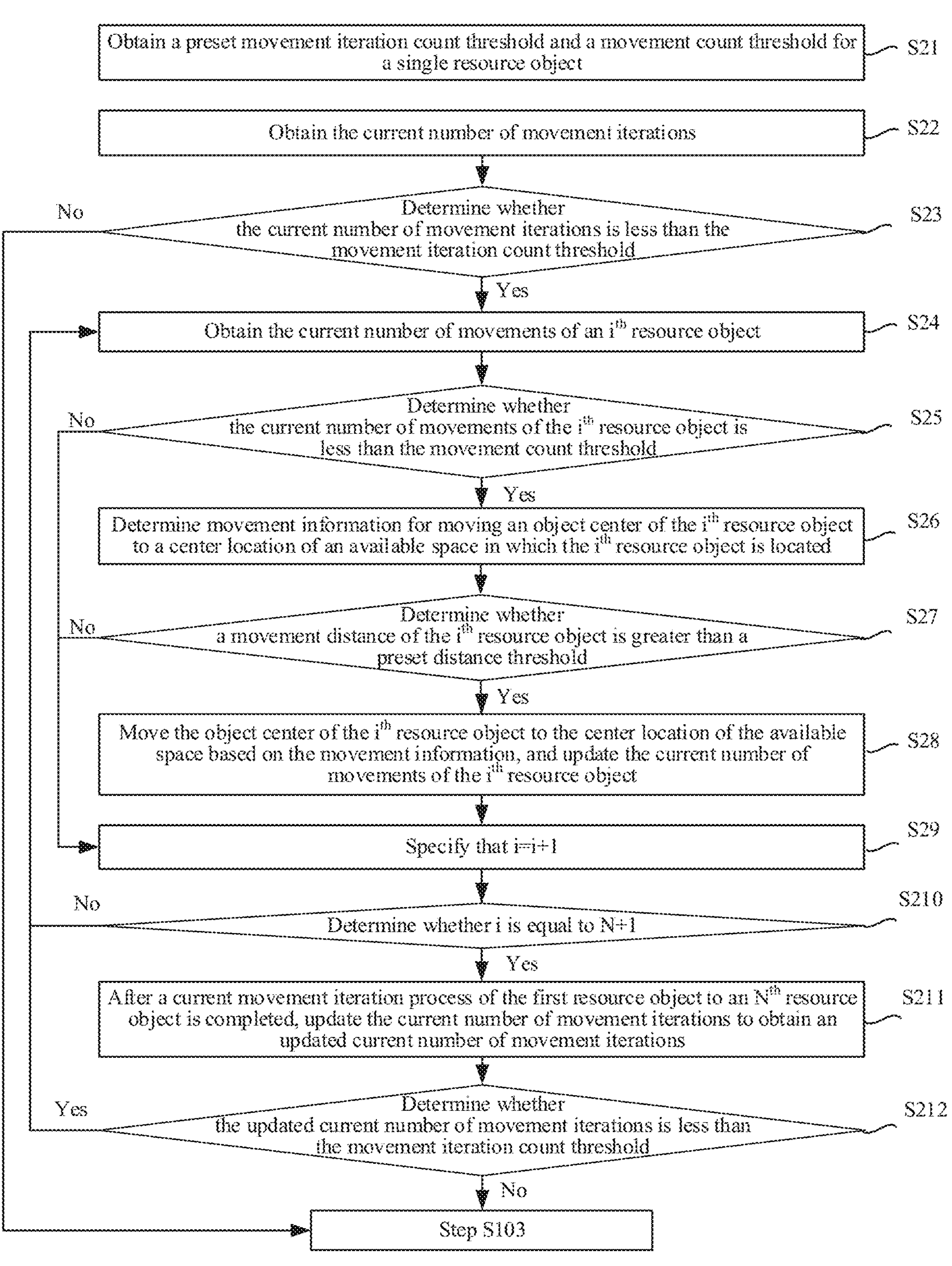
FIG. 5 is a schematic implementation flowchart of moving each resource object to a center of a corresponding available space according to an embodiment of this application.

In some embodiments, the "moving, based on the initial filling result, an object center of each resource object to a center location of an available space corresponding to the resource object" in step S102 may be implemented by step S21 to step S212 shown in FIG. 5. The steps are described below with reference to FIG. 5.

Step S21: Obtain a preset movement iteration count threshold and a movement count threshold for a single resource object.

The movement iteration count threshold is greater than or equal to the movement count threshold for a single resource object. The movement iteration count threshold and the movement count threshold may be determined based on the total number of resource objects, or may be set by a user according to a requirement of the user.

Step S22: Obtain the current number of movement iterations.

In this embodiment of this application, an initial value of a variable for the current number of movement iterations may be set to 0, and the current number of movement iterations is increased by 1 after each round of movement of the first resource object to the $N^{th}$ resource object is completed.

Step S23: Determine whether the current number of movement iterations is less than the movement iteration count threshold.

When the current number of movement iterations is less than the movement iteration count threshold, step S24 is performed. When the current number of movement iterations is greater than or equal to the movement iteration count threshold, step S103 is performed.

Step S24: Obtain the current number of movements of the $i^{th}$ resource object.

$i=1, 2, \ldots, N$. N is the total number of resource objects, and N is an integer greater than 2.

Step S25: Determine whether the current number of movements of the $i^{th}$ resource object is less than the movement count threshold.

When the current number of movements of the $i^{th}$ resource object is less than the movement count threshold, step S26 is performed. When the current number of movements of the $i^{th}$ resource object is greater than or equal to the movement count threshold, step S29 is performed.

Step S26: Determine movement information for moving an object center of the $i^{th}$ resource object to a center location of an available space in which the $i^{th}$ resource object is located.

In this embodiment of this application, the object center of the $i^{th}$ resource object may be represented by a center of a bounding box corresponding to the $i^{th}$ resource object. The bounding box of the $i^{th}$ resource object may be an axis-aligned bounding box of the $i^{th}$ resource object or an optimal bounding box of the $i^{th}$ resource object. A bounding box of a resource object is usually a rectangle, and a center of the bounding box is an intersection point of two diagonal lines of the rectangle.

In some embodiments, the $i^{th}$ resource object may be moved to the left and the right along the x-axis. An amount of leftward movement when the $i^{th}$ resource object is moved to the left until the $i^{th}$ resource object is in contact with another resource object is determined. An amount of rightward movement when the $i^{th}$ resource object is moved to the right until the $i^{th}$ resource object is in contact with another resource object is determined. Movement information of the $i^{th}$ resource object in an x-axis direction is calculated based on (the amount of rightward movement–the amount of leftward movement)/2. The movement information may include an amount of movement and a movement direction. An absolute value of (the amount of rightward movement–the amount of leftward movement)/2 represents the amount of movement. A positive/negative property of (the amount of rightward movement–the amount of leftward movement)/2 represents the movement direction. A positive property indicates rightward movement, and a negative property indicates leftward movement. Similarly, the $i^{th}$ resource object is moved upward and downward along a y-axis. An amount of upward movement when the $i^{th}$ resource object is moved upward until the $i^{th}$ resource object is in contact with another resource object is determined. An amount of downward movement when the $i^{th}$ resource object is moved downward until the $i^{th}$ resource object is in contact with another resource object is determined. Movement information of the $i^{th}$ resource object in a y-axis direction is calculated based on (the amount of upward movement–the amount of downward movement)/2.

For example, the amount of leftward movement of the $i^{th}$ resource object is 3, the amount of rightward movement is 5, the amount of upward movement is 4, and the amount of downward movement is 8. In this case, the movement information in the x-axis direction is as follows: (5–3)/2=1, to be specific, the amount of movement is 1, and the movement direction is rightward; and the movement information in the y-axis direction is as follows: (4–8)/2=–2, to be specific, the amount of movement is 2, and the movement direction is downward.

Step S27: Determine whether a movement distance of the $i^{th}$ resource object is greater than a preset distance threshold.

In some embodiments, the movement distance of the $i^{th}$ resource object is first determined based on the movement information determined in step S26. Because the movement information determined in step S26 includes the movement information $d_1$ in the x-axis direction and the movement information $d_2$ in the y-axis direction, the movement distance corresponding to the $i^{th}$ resource object is $$\sqrt{d_1^2 + d_2^2}.$$

Then whether the movement distance of the $i^{th}$ resource object is greater than the preset distance threshold is determined. In the case of determining that the movement distance of the $i^{th}$ resource object is greater than the preset distance threshold, step S28 is performed. In the case of determining that the movement distance of the $i^{th}$ resource object is less than or equal to the distance threshold, step S29 is performed.

Step S28: Move the object center of the $i^{th}$ resource object to the center location of the available space based on the movement information, and update the current number of movements of the $i^{th}$ resource object.

During implementation of this step, whether the $i^{th}$ resource object includes another resource subobject may be determined. When the $i^{th}$ resource object includes a resource subobject, the $i^{th}$ resource object and the resource subobject included in the $i^{th}$ resource object are simultaneously moved during movement of the $i^{th}$ resource object. In this case, a relative relationship between the $i^{th}$ resource object and the resource subobject included in the $i^{th}$ resource object remains unchanged during movement of the $i^{th}$ resource object. Therefore, in this step, only the current number of movements of the $i^{th}$ resource object is updated, without updating the current number of movements of the resource subobject of the $i^{th}$ resource object.

Step S29: Specify that i=i+1.

Step S210: Determine whether i is equal to N+1.

When i is equal to N+1, it indicates that a current movement iteration process of the first resource object to the $N^{th}$ resource object is completed, and in this case, step S211 is performed. When i is not equal to N+1, it indicates that the current movement iteration process has not been completed, and in this case, step S24 is performed.

Step S211: After the current movement iteration process of the first resource object to the $N^{th}$ resource object is completed, update the current number of movement iterations to obtain an updated current number of movement iterations.

The updating the current number of movement iterations means increasing the current number of movement iterations by 1.

Step S212: Determine whether the updated current number of movement iterations is less than the movement iteration count threshold.

In the case of determining that the updated current number of movement iterations is less than the movement iteration count threshold, step S24 is performed to continue to move the first resource object to the $N^{th}$ resource object. In the case of determining that the updated current number of movement iterations is greater than or equal to the movement iteration count threshold, it indicates that a movement end condition is met, and step S103 is performed.

In the case of moving each resource object to a center location of an available space corresponding to the resource object, movement of a resource object affects a relative location of another resource object adjacent to the resource object in a corresponding available space. For example, before a resource object is moved, an adjacent resource object of the resource object is at a center location of an available space corresponding to the adjacent resource object. However, after the resource object is moved, a size of the available space corresponding to the adjacent resource object of the resource object and an outer edge of the available space change. Consequently, the adjacent resource object is no longer at the center location of the available space. Therefore, after one movement iteration is performed, most resource objects are usually not at center locations of available spaces respectively corresponding to the resource objects. Therefore, a resource object may undergo a plurality of movement iterations. In this embodiment of this application, the movement count threshold for a single resource object and the overall movement iteration count threshold are set. The movement count threshold for a single resource object is set to avoid a timeout caused by cyclic movement of one or more resource objects. The movement iteration count threshold is set to avoid a plurality of iterations without clear effect and a final timeout when too many resource objects. In some embodiments, the movement iteration count threshold and the movement count threshold for a single resource object may be set based on the total number of resource objects, to achieve optimal movement effect while ensuring execution efficiency, and achieve an adaptive balance between execution efficiency and execution effect.

Figure 6:
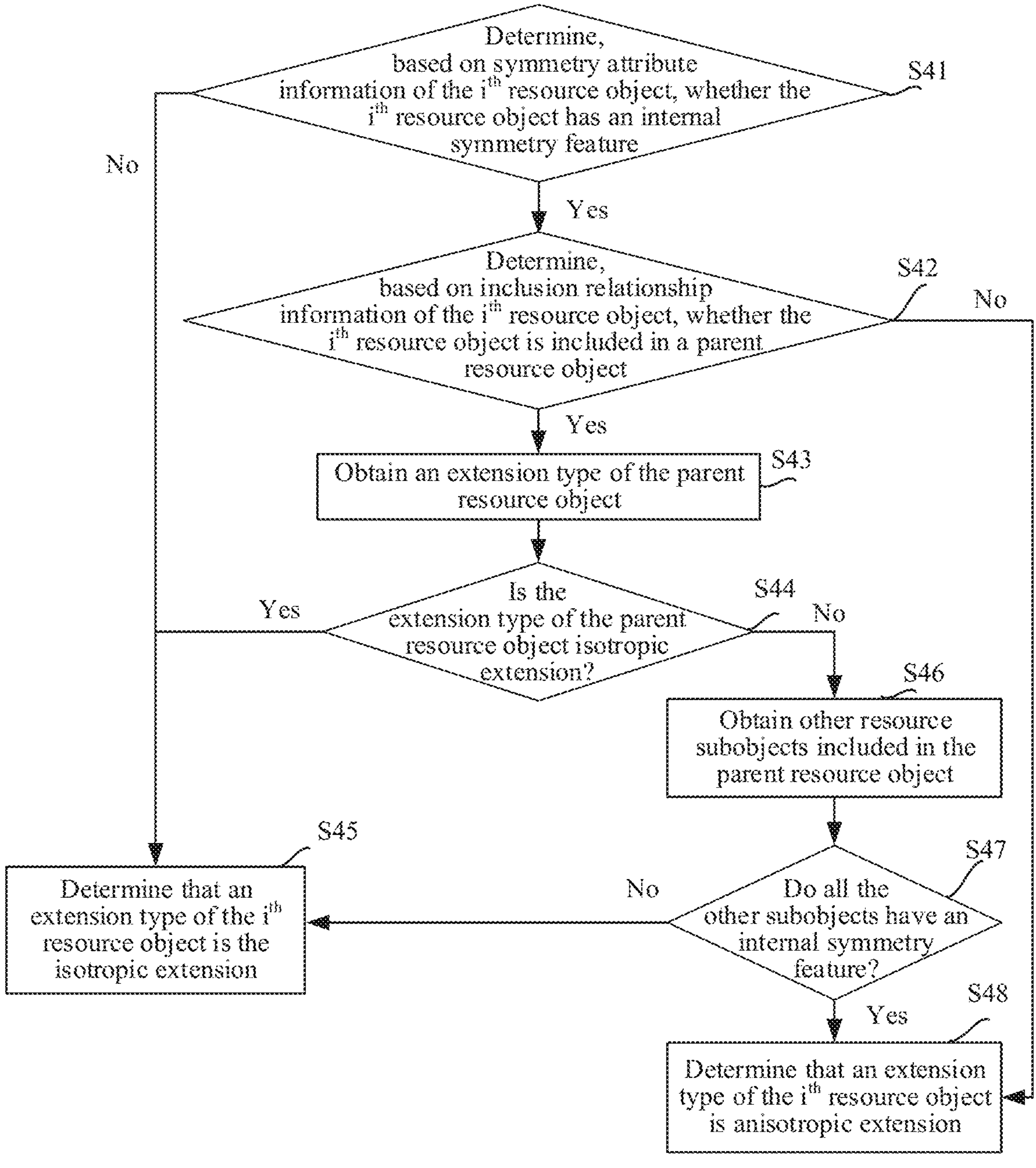
FIG. 6 is a schematic implementation flowchart of moving a first target object to a first target available space according to an embodiment of this application.

In some embodiments, the "determining an extension type of each resource object based on the symmetry attribute information and the inclusion relationship information of each resource object" in step S104 may be implemented by step S41 to step S48 shown in FIG. 6. The steps are described below with reference to FIG. 6.

Step S41: Determine, based on symmetry attribute information of the $i^{th}$ resource object, whether the $i^{th}$ resource object has an internal symmetry feature.

i=1, 2, . . . , N. N is the total number of resource objects, and N is an integer greater than 2.

The symmetry attribute information of the $i^{th}$ resource object includes bilateral symmetry attribute information and longitudinal symmetry attribute information. In some embodiments, when determining that the $i^{th}$ resource object is bilaterally symmetric based on the bilateral symmetry attribute information, or determining that the $i^{th}$ resource object is longitudinally symmetric based on the longitudinal symmetry attribute information, and determining that the $i^{th}$ resource object has an internal symmetry feature, step S42 is performed; or when determining that the $i^{th}$ resource object is not bilaterally symmetric based on the bilateral symmetry attribute information, determining that the $i^{th}$ resource object is not longitudinally symmetric based on the longitudinal symmetry attribute information, and determining that the $i^{th}$ resource object does not have an internal symmetry feature, step S45 is performed.

In other words, when the $i^{th}$ resource object meets at least one of bilateral symmetry and longitudinal symmetry, it is determined that the $i^{th}$ resource object has an internal symmetry feature; or when the $i^{th}$ resource object meets neither bilateral symmetry nor longitudinal symmetry, it is determined that the $i^{th}$ resource object does not have an internal symmetry feature.

Step S42: Determine, based on inclusion relationship information of the $i^{th}$ resource object, whether the $i^{th}$ resource object is included in a parent resource object.

The inclusion relationship information of the $i^{th}$ resource object includes a first object set and a second object set. The first object set includes an object identifier of a resource subobject included in the resource object. The second object set includes an object identifier of a parent resource object including the resource object. In some embodiments, whether the second object set is empty may be determined. When the second object set is not empty, it indicates that the $i^{th}$ resource object is included in a parent resource object, and in this case, step S43 is performed. When the second object set is empty, it indicates that the $i^{th}$ resource object is not included in a parent resource object, and in this case, step S48 is performed.

Step S43: Obtain an extension type of the parent resource object.

Step S44: Determine whether the extension type of the parent resource object is the isotropic extension.

When the extension type of the parent resource object is the isotropic extension, step S45 is performed. When the extension type of the parent resource object is the anisotropic extension, step S46 is performed.

Step S45: Determine that an extension type of the $i^{th}$ resource object is the isotropic extension.

Step S46: Obtain other resource subobjects included in the parent resource object.

Step S47: Determine whether all the other resource subobjects have an internal symmetry feature.

In the case of determining, based on symmetry attribute information of the other resource subobjects, that all the other resource subobjects have an internal symmetry feature, step S48 is performed. In the case of determining, based on the symmetry attribute information of the other resource subobjects, that at least one of the other resource subobjects does not have an internal symmetry feature, step S45 is performed.

Step S48: Determine that an extension type of the $i^{th}$ resource object is the anisotropic extension.

In the embodiment of step S41 to step S48, when determining the extension type of the $i^{th}$ resource object, when the $i^{th}$ resource object does not have an internal symmetry feature, it is directly determined that the extension type of the $i^{th}$ resource object is the isotropic extension, to avoid deformation after the extension; or when the $i^{th}$ resource object has an internal symmetry feature, whether the $i^{th}$ resource object is included in a parent resource object further needs to be determined. When the $i^{th}$ resource object is not included in a parent resource object, it may be determined that the extension type of the $i^{th}$ resource object is the anisotropic extension, to implement maximum extension in all directions. When the $i^{th}$ resource object is included in a parent resource object and an extension type of the parent resource object is the isotropic extension, it is determined that the extension type of the $i^{th}$ resource object is also the isotropic extension, to avoid overlapping between resource objects after the extension. When the extension type of the parent resource object is the anisotropic extension and all resource subobjects of the parent resource object have an internal symmetry feature, it may be determined that the extension type of the $i^{th}$ resource object and extension types of other resource subobjects are the anisotropic extension. This can avoid overlapping between different resource objects during extension, and can also ensure extension at maximum ratios in all extension directions, to increase a filling rate of the target container.

In this embodiment of this application, the initial filling result obtained by packing the plurality of resource objects includes a case in which another resource object is further nested in a resource object, or may include a case in which several resource objects have a symmetric relationship. In this case, the "extending each resource object based on the extension type of each resource object to obtain each processed resource object" in step S105 is implemented by the following step S51 to step S519. The steps are described below.

Step S51: Determine whether the target container includes a symmetric object of the $i^{th}$ resource object.

i=1, 2, . . . , N. N is the total number of resource objects, and N is an integer greater than 2. In the case of determining that the target container does not include a symmetric object of the $i^{th}$ resource object, step S52 is performed. In the case of determining that the target container includes a symmetric object of the $i^{th}$ resource object, step S517 is performed.

Step S52: Determine whether the extension type of the $i^{th}$ resource object is the isotropic extension.

In the case of determining that the extension type of the $i^{th}$ resource object is the isotropic extension, step S53 is performed. In the case of determining that the extension type of the $i^{th}$ resource object is the anisotropic extension, step S58 is performed.

Step S53: Move the object center of the $i^{th}$ resource object to the center location of the corresponding available space.

An implementation process of this step is similar to that of step S102. During implementation, refer to the implementation process of step S102.

The plurality of resource objects in the target container are globally homogenized in step S102. However, after a resource object is extended, a location of an unextended resource object is affected. Consequently, the resource object is no longer be at a center location of a corresponding available space. Therefore, before the $i^{th}$ resource object is extended, the object center of the $i^{th}$ resource object is moved to the center location of the corresponding available space again to ensure a determined maximum extension ratio.

Step S54: Determine a first extension ratio for the $i^{th}$ resource object.

In some embodiments, the first extension ratio for the $i^{th}$ resource object may be determined by using a bidirectional ray method. First, a ray is emitted outward from the object center of the $i^{th}$ resource object along a vertex of an outer boundary of the $i^{th}$ resource object to obtain an intersection point with another resource object outside the $i^{th}$ resource object, and a corresponding first candidate extension ratio is calculated accordingly. Then a ray is emitted from a vertex of an outer boundary of the another resource object outside the $i^{th}$ resource object toward the object center of the $i^{th}$ resource object to obtain a closest intersection point with the outer boundary of the $i^{th}$ resource object, and a corresponding second candidate extension ratio is calculated accordingly. A smaller one of the first candidate extension ratio and the second candidate extension ratio is used as the first extension ratio to avoid overlapping with the another resource object during extension.

In some embodiments, the "determining a first extension ratio for the $i^{th}$ resource object" in step S54 may be implemented by the following steps:

Step S541: Obtain outer boundary information of the another resource object outside the $i^{th}$ resource object, outer boundary information of the $i^{th}$ resource object, and the object center of the $i^{th}$ resource object.

During implementation of obtaining the outer boundary information of the $i^{th}$ resource object, each edge on the resource object and two adjacent surfaces of each edge may be obtained first, and then whether the adjacent surfaces of each edge are located inside the resource object may be determined. When both adjacent surfaces of an edge are located inside the resource object, it is determined that the edge is an inner edge; otherwise, it is determined that the edge is an outer boundary. Outer boundaries of a resource object are connected to form an outer boundary of the resource object.

The object center of the $i^{th}$ resource object may be represented by the center of the bounding box of the $i^{th}$ resource object. The outer boundary information of the another resource object outside the $i^{th}$ resource object may include a vertex identifier, a vertex index, or other information of the vertex on the outer boundary of the another resource object outside the $i^{th}$ resource object. The outer boundary information of the $i^{th}$ resource object includes a vertex identifier, a vertex index, or other information of the vertex on the outer boundary of the $i^{th}$ resource object.

Step S542: Emit a first ray from the object center of the $i^{th}$ resource object to each first vertex on the outer boundary of the $i^{th}$ resource object, and determine each first closest intersection point between each first ray and the outer boundary of the another resource object.

In some embodiments, a first spatial search tree may be constructed based on the outer boundary information of the another resource object outside the $i^{th}$ resource object. A primitive of the first spatial search tree is a connection edge on the outer boundary of the another resource object. Then each first closest intersection point between each first ray and the outer boundary of the another resource object is determined by using the first spatial search tree.

Step S543: Determine a first candidate extension ratio corresponding to each first vertex based on center coordinates of the object center, first vertex coordinates of each first vertex, and first intersection point coordinates of each first closest intersection point.

In some embodiments, this step may be implemented by the following steps:

Step S5431: Obtain a spacing distance.

The spacing distance corresponds to the padding in other embodiments. The spacing distance may be preset, or may be automatically determined based on a resolution of a packing space. For example, it may be assumed that one pixel is taken out of every 128 pixels as the spacing distance. In this case, two pixels are usually used as the spacing distance at a resolution of 256×256. In this way, the spacing distance is automatically calculated and reserved based on the resolution of the packing space, to effectively avoid a possible error caused by manually reserving a spacing distance during manual packing.

Step S5432: Determine, based on the spacing distance and the intersection point coordinates of each first closest intersection point, first target coordinates of a first target point corresponding to each first closest intersection point.

The first target point is a point on the first ray. A distance between the first target point and the first closest intersection point is the spacing distance, and the first target point is located between the first closest intersection point and the object center.

Step S5433: Determine a first distance corresponding to each first vertex based on the center coordinates of the object center and the first vertex coordinates of each first vertex.

In some embodiments, when the center coordinates of the object center and the first vertex coordinates of each first vertex are known, the first distance corresponding to each first vertex may be determined based on a distance formula. The first distance is a distance between the first vertex and the object center.

Step S5434: Determine a second distance corresponding to each first vertex based on the center coordinates of the object center and first target coordinates of each first target point.

Similar to step 5433, when the center coordinates of the object center and the first target coordinates of each first target point are known, the second distance corresponding to each first vertex may be determined based on a distance formula. The second distance is a distance between the first target point and the object center.

Step S5435: Determine the first candidate extension ratio corresponding to each first vertex based on the first distance and the second distance that correspond to each first vertex.

In some embodiments, the second distance corresponding to each first vertex is divided by the first distance to obtain the first candidate extension ratio corresponding to each first vertex.

Step S544: Emit a second ray from each second vertex on the outer boundary of the another resource object to the object center of the $i^{th}$ resource object, and determine each second closest intersection point between each second ray and the outer boundary of the $i^{th}$ resource object.

In some embodiments, a second spatial search tree may be constructed based on the outer boundary information of the $i^{th}$ resource object. A primitive of the second spatial search tree is a connection edge on the outer boundary of the $i^{th}$ resource object. Then each second closest intersection point between each second ray and the outer boundary of the $i^{th}$ resource object is determined by using the second spatial search tree.

Step S545: Determine a second candidate extension ratio corresponding to each second vertex based on the center coordinates of the object center, second vertex coordinates of each second vertex, and second intersection point coordinates of each second closest intersection point.

Herein, second target coordinates of a second target point corresponding to each second closest intersection point are first determined based on the spacing distance and the intersection point coordinates of each second closest intersection point. The second target point is a point on the second ray. A distance between the second target point and the second vertex is the spacing distance, and the second target point is located between the second vertex and the object center. Then a fifth distance corresponding to each second vertex is determined based on the center coordinates of the object center and the intersection point coordinates of each second closest intersection point, and a sixth distance corresponding to each second vertex is determined based on the center coordinates of the object center and second target coordinates of each second target point. The sixth distance corresponding to each second vertex is divided by the corresponding fifth distance to obtain the second candidate extension ratio corresponding to each second vertex.

Step S546: Determine a smallest one of a plurality of first candidate extension ratios and a plurality of second candidate extension ratios as the first extension ratio for the $i^{th}$ resource object.

In the embodiment of step S541 to step S546, the first extension ratio for isotropic extension of the $i^{th}$ resource object is determined by using the bidirectional ray method. First, a first ray is emitted outward from the object center of the $i^{th}$ resource object along a vertex of the outer boundary of the $i^{th}$ resource object to obtain a first closest intersection point with another resource object outside the $i^{th}$ resource object, and a corresponding first candidate extension ratio is calculated accordingly. Then a second ray is emitted from a vertex of an outer boundary of the another resource object outside the $i^{th}$ resource object toward the object center of the $i^{th}$ resource object to obtain a second closest intersection point with the outer boundary of the $i^{th}$ resource object, and a corresponding second candidate extension ratio is calculated accordingly. In addition, during calculation of the first candidate extension ratio and the second candidate extension ratio, the spacing distance is reserved, in other words, some gaps are reserved, to avoid overlapping with the another resource object during extension of the resource object.

Steps performed after step S54 are further described below.

Step S55: Determine whether the $i^{th}$ resource object includes another resource subobject.

In the case of determining, based on the inclusion relationship information of the $i^{th}$ resource object, that the $i^{th}$ resource object includes another resource subobject, step S56 is performed. In the case of determining that the $i^{th}$ resource object does not include another resource subobject, step S57 is performed.

S56: Extend the $i^{th}$ resource object and the another resource subobject included in the $i^{th}$ resource object based on the first extension ratio to obtain a processed $i^{th}$ resource object and processed another resource subobject.

In some embodiments, the $i^{th}$ resource object and the another resource subobject included in the $i^{th}$ resource object are extended based on the first extension ratio with the object center of the $i^{th}$ resource object as an extension center, to obtain the processed $i^{th}$ resource object and the processed another resource subobject.

Step S57: Extend the $i^{th}$ resource object based on the first extension ratio to obtain a processed $i^{th}$ resource object.

In the case of determining that the $i^{th}$ resource object does not include another resource subobject, only the $i^{th}$ resource object needs to be extended. In some embodiments, isotropic extension is performed on the $i^{th}$ resource object based on the first extension ratio with the object center of the $i^{th}$ resource object as an extension center, to obtain the processed $i^{th}$ resource object.

Step S58: Obtain principal axis information of the $i^{th}$ resource object, and determine a rotational angle and a first rotation direction based on the principal axis information of the $i^{th}$ resource object.

A principal axis of the $i^{th}$ resource object is a widest one of a plurality of baselines passing through the object center of the $i^{th}$ resource object. The principal axis information of the $i^{th}$ resource object is a type of attribute information of the $i^{th}$ resource object. The principal axis information of the $i^{th}$ resource object includes an included angle between the principal axis and the x-axis. The principal axis information of the $i^{th}$ resource object changes when adding the $i^{th}$ resource object to the target container or moving the $i^{th}$ resource object. Assuming that the principal axis information of the $i^{th}$ resource object is 45 degrees, it may be determined, based on the principal axis information, that the rotational angle is 45 degrees and the first rotation direction is a clockwise direction.

Step S59: Rotate the N resource objects in the first rotation direction by the rotational angle to obtain N rotated resource objects.

In this step, all the N resource objects in the target container are rotated to ensure that relative locations of the $i^{th}$ resource object and other resource objects remain unchanged. A principal axis of a rotated $i^{th}$ resource object is in a horizontal direction. To be specific, the principal axis of the rotated $i^{th}$ resource object is parallel to the x-axis.

Step S510: Move an object center of the rotated $i^{th}$ resource object to a center location of a corresponding available space.

An implementation process of this step is similar to that of step S102. During implementation, refer to the implementation process of step S102.

Step S511: Determine a second extension ratio for the rotated $i^{th}$ resource object in each preset extension direction.

In some embodiments, a plurality of candidate points corresponding to each extension direction may be determined from an outer boundary of the rotated $i^{th}$ resource object, a third ray is emitted from each extension direction corresponding to each candidate point, a closest intersection point between each third ray and the outer boundary of the another resource object is determined, and the second extension ratio for the rotated $i^{th}$ resource object in each extension direction is determined based on the closest intersection point.

In some embodiments, the "determining a second extension ratio for the rotated $i^{th}$ resource object in each preset extension direction" in step S511 may be implemented by the following steps:

Step S5111: Obtain outer boundary information of another resource object outside the rotated $i^{th}$ resource object and a bounding box of the rotated $i^{th}$ resource object.

Step S5112: Determine a plurality of candidate points corresponding to a $j^{th}$ extension direction from the outer boundary of the rotated $i^{th}$ resource object.

Vertices of an outer boundary of a resource object are sorted in a counterclockwise direction. Therefore, in some embodiments, when the $j^{th}$ extension direction is an up direction, a connection edge, on the outer boundary of the $i^{th}$ resource object, at which an x coordinate of a starting point is greater than an x coordinate of an ending point is determined as a candidate connection edge, and a vertex of the candidate connection edge is determined as a candidate point. Then a vertex on the outer boundary of the another resource object outside the $i^{th}$ resource object is projected along an opposite direction (namely, a down direction) of the $j^{th}$ extension direction (namely, the up direction), and a point projected onto the candidate connection edge is also determined as a candidate points in the $j^{th}$ extension direction. Similarly, when the $j^{th}$ extension direction is a down direction, a connection edge, on the outer boundary of the $i^{th}$ resource object, at which an x coordinate of a starting point is less than an x coordinate of an ending point is determined as a candidate connection edge, and a vertex of the candidate connection edge is determined as a candidate point. Then a vertex on the outer boundary of the another resource object outside the $i^{th}$ resource object is projected along an opposite direction (namely, an up direction) of the $j^{th}$ extension direction (namely, the down direction), and a point projected onto the candidate connection edge is also determined as a candidate points in the $j^{th}$ extension direction.

Step S5113: Emit a third ray from each candidate point along the $j^{th}$ extension direction, and determine a third closest intersection point between each third ray and the outer boundary of the another resource object.

j is a positive integer less than or equal to M. M is the total number of extension directions, and M is an integer greater than or equal to 1. In some embodiments, a second spatial search tree may be constructed based on the outer boundary information of the $i^{th}$ resource object. A primitive of the second spatial search tree is a connection edge on the outer boundary of the $i^{th}$ resource object. Then each third closest intersection point between each third ray and the outer boundary of the $i^{th}$ resource object is determined by using the second spatial search tree.

Step S5114: Determine each third distance from each candidate point to a target edge of the bounding box, and determine each fourth distance from each third closest intersection point to the target edge.

The target edge is an edge of the bounding box that corresponds to an opposite direction of the $j^{th}$ extension direction. For example, when the $j^{th}$ extension direction is an up direction, the target edge is a lower horizontal edge of the bounding box; or when the $j^{th}$ extension direction is a left direction, the target edge is a right vertical edge of the bounding box.

Step S5115: Determine a third candidate extension ratio corresponding to each candidate point based on each third distance and each corresponding fourth distance.

In some embodiments, a fourth distance for each candidate point is divided by a corresponding third distance to obtain the third candidate extension ratio corresponding to each candidate point.

Step S5116: Determine a smallest one of a plurality of third candidate extension ratios as a second extension ratio corresponding to the $j^{th}$ extension direction.

In the embodiment of step S5111 to step S5116, when determining the second extension ratio in each extension direction for anisotropic extension of the $i^{th}$ resource object, a plurality of candidate points corresponding to each extension direction may be first determined from the outer boundary of the $i^{th}$ resource object. Then a third ray may be emitted from each candidate point toward each extension direction, a third closest intersection point between each third ray and the outer boundary of the another resource object is determined, and the second extension ratio corresponding to each extension direction is determined based on the third closest intersection point, the candidate points, and a target edge, corresponding to an opposite direction of each extension direction, of the bounding box of the $i^{th}$ resource object. In this way, the $i^{th}$ resource object can be extended to the maximum extent in each extension direction.

Steps performed after step S511 are further described below.

Step S512: Determine whether the rotated $i^{th}$ resource object includes another resource subobject.

In the case of determining, based on inclusion relationship information of the $i^{th}$ resource object, that the rotated $i^{th}$ resource object includes another resource subobject, step S513 is performed. In the case of determining that the rotated $i^{th}$ resource object does not include another resource object, step S514 is performed.

Step S513: Extend the rotated $i^{th}$ resource object and the another resource subobject included in the rotated $i^{th}$ resource object in each extension direction based on a corresponding second extension ratio to obtain an extended $i^{th}$ resource object and extended another resource subobject.

In step S58 and step S59, the principal axis of the $i^{th}$ resource object has been rotated to the horizontal direction. Therefore, one of two adjacent edges of the bounding box of the $i^{th}$ resource object is in the horizontal direction, and the other is in a vertical direction. The extension direction may be at least one of an up direction, a down direction, a left direction, and a right direction. In some embodiments, based on an edge, in an opposite direction corresponding to each extension direction, of the bounding box of the $i^{th}$ resource object, the rotated $i^{th}$ resource object and the another resource subobject included in the rotated $i^{th}$ resource object are extended in each extension direction based on a corresponding second extension ratio to obtain the extended $i^{th}$ resource object and the extended another resource subobject.

An example in which the extension direction is the up direction is used for description. Based on a lower horizontal edge of the bounding box of the $i^{th}$ resource object (to be specific, the lower horizontal edge remains stationary), the $i^{th}$ resource object and the another resource subobject included in the $i^{th}$ resource object are extended upward at a corresponding second extension ratio.

Step S514: Extend the rotated $i^{th}$ resource object in each extension direction based on a corresponding second extension ratio to obtain an extended $i^{th}$ resource object.

Step S515: Rotate the extended $i^{th}$ resource object and the extended another resource subobject in a second rotation direction by the rotational angle to obtain a processed $i^{th}$ resource object and processed another resource subobject.

The second rotation direction is an opposite direction of the first rotation direction. In this step, the N resource objects in the target container are rotated in the opposite direction of the first rotation direction by the rotational angle to restore the N resource objects in the target container to attitudes that exist before the rotation.

Step S516: Separately determine a first reference extension ratio for the $i^{th}$ resource object and a second reference extension ratio for the symmetric object based on the extension type of the $i^{th}$ resource object.

When the $i^{th}$ resource object has a symmetric object, extension types of the $i^{th}$ resource object and the symmetric object are the same. In some embodiments, when the extension type of the $i^{th}$ resource object is the isotropic extension, the first reference extension ratio for the $i^{th}$ resource object and the second reference extension ratio for the symmetric object may be determined by using a process similar to step S541 to step S546. When the extension type of the $i^{th}$ resource object is the anisotropic extension, a first reference extension ratio for the $i^{th}$ resource object in each extension direction and a second reference extension ratio for the symmetric object in each direction may be determined with reference to step S58 to step S511.

Step S517: Determine a smaller one of the first reference extension ratio and the second reference extension ratio as a target extension ratio for the $i^{th}$ resource object and the symmetric object.

In some embodiments, when the extension type of the $i^{th}$ resource object is the isotropic extension, the $i^{th}$ resource object and the symmetric object each correspond to a reference extension ratio, and a smallest one of a first reference extension ratio and at least one second reference extension ratio is determined as the target extension ratio for the $i^{th}$ resource object and the symmetric object. When the extension type of the $i^{th}$ resource object is the anisotropic extension, the $i^{th}$ resource object and the symmetric object each correspond to a reference extension ratio in each extension direction. It is assumed that four extension directions exist: up, down, left, and right. In this case, a smallest one of reference extension ratios corresponding to the $i^{th}$ resource object and the symmetric object in each extension direction is determined as the target extension ratio in each extension direction.

Step S518: Extend the $i^{th}$ resource object and the symmetric object based on the target extension ratio to obtain a processed $i^{th}$ resource object and a processed symmetric object.

In some embodiments, when the $i^{th}$ resource object and the symmetric object overlap with other resource objects after the extension, the $i^{th}$ resource object and the symmetric object are restored to attitudes that exist before the extension.

In step S51 to step S518, the $i^{th}$ resource object can be extended in different extension modes based on whether the $i^{th}$ resource object has a symmetric objects and the extension type of the $i^{th}$ resource object. When the $i^{th}$ resource object does not have a symmetric object, extension is directly performed based on the extension type of the $i^{th}$ resource object. However, when the $i^{th}$ resource object includes another resource subobject, the $i^{th}$ resource object and the resource subobject of the $i^{th}$ resource object may be further extended simultaneously. This can avoid overlapping between the $i^{th}$ resource object and the resource subobject included in the $i^{th}$ resource object during extension of the $i^{th}$ resource object, and can also simultaneously extend a plurality of resource objects, to improve object processing efficiency. When the $i^{th}$ resource object has a symmetric object, a first reference extension ratio for the $i^{th}$ resource object and a second reference extension ratio for the symmetric object need to be separately determined, and a smaller value is used as the target extension ratio, to ensure that the $i^{th}$ resource object and the symmetric object can retain same sizes after the extension.

The following describes exemplary application of the embodiments of this application in a real application scenario.

Figure 7:
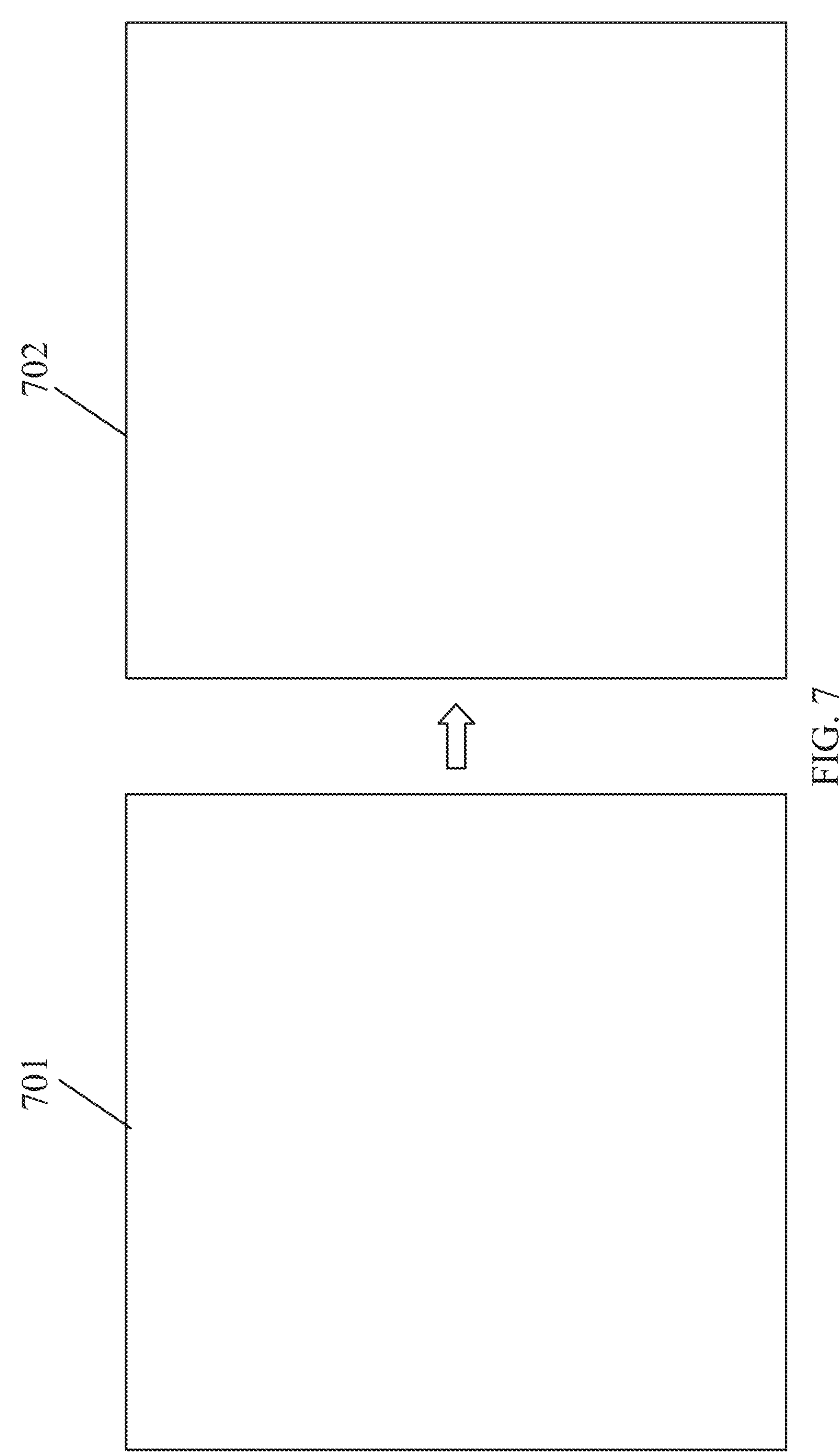
FIG. 7 is a schematic diagram of manually modifying a packing result.

For specific types of packing problems such as 2UV unwrapping, UV islands usually can be extended to some extent to improve packing effect. For example, for 2UV unwrapping shown in FIG. 7, an initial packing result is shown in 701 on the left. In this case, most art production persons extend these UV islands to achieve effect shown in 702 on the right, to improve memory utilization during rendering and therefore maximize a texture resolution.

The object processing method provided in the embodiments of this application may be applied to an automatic 2UV unwrapping tool to implement automated 2UV unwrapping for various game scene models with a baking requirement, including a character model, a vehicle model, a building model, and the like. In some embodiments, a terminal displays a model selection interface in response to an operation instruction for "Model import" in the automatic 2UV unwrapping tool, and determines data of a target three-dimensional model based on a model selection operation received on the model selection interface. The terminal performs patch triangulation on the target three-dimensional model by using the automatic 2UV tool in response to a received UV unwrapping operation instruction, to obtain a plurality of two-dimensional UV islands (resource objects). Then the terminal packs the plurality of UV islands to obtain an initial packing result, and determines an extension type of each UV island based on symmetry attribute information and inclusion relationship information of each UV island. The extension type includes one of isotropic extension and anisotropic extension. The terminal extends each UV island based on the extension type of each UV island to obtain each processed UV island. Each UV island in the initial packing result is extended, and the UV island is moved to a center location before being extended, so that extension can be performed in limited space at a maximum ratio. This can minimize an available space to increase a filling rate of a target container. Then the terminal maps the three-dimensional model by using a final packing result. During implementation, the terminal determines a target UV island for mapping in response to a received UV island selection instruction, and the terminal displays a plurality of candidate map images of the target UV island in response to a mapping operation for the target UV island. Then the terminal receives a map selection operation, determines a target map image based on the map selection operation, and maps the target UV island based on the target map image. The UV islands are extended during packing. Therefore, a resolution of texture mapping can be increased when mapping the UV islands in the three-dimensional model.

Figure 8:
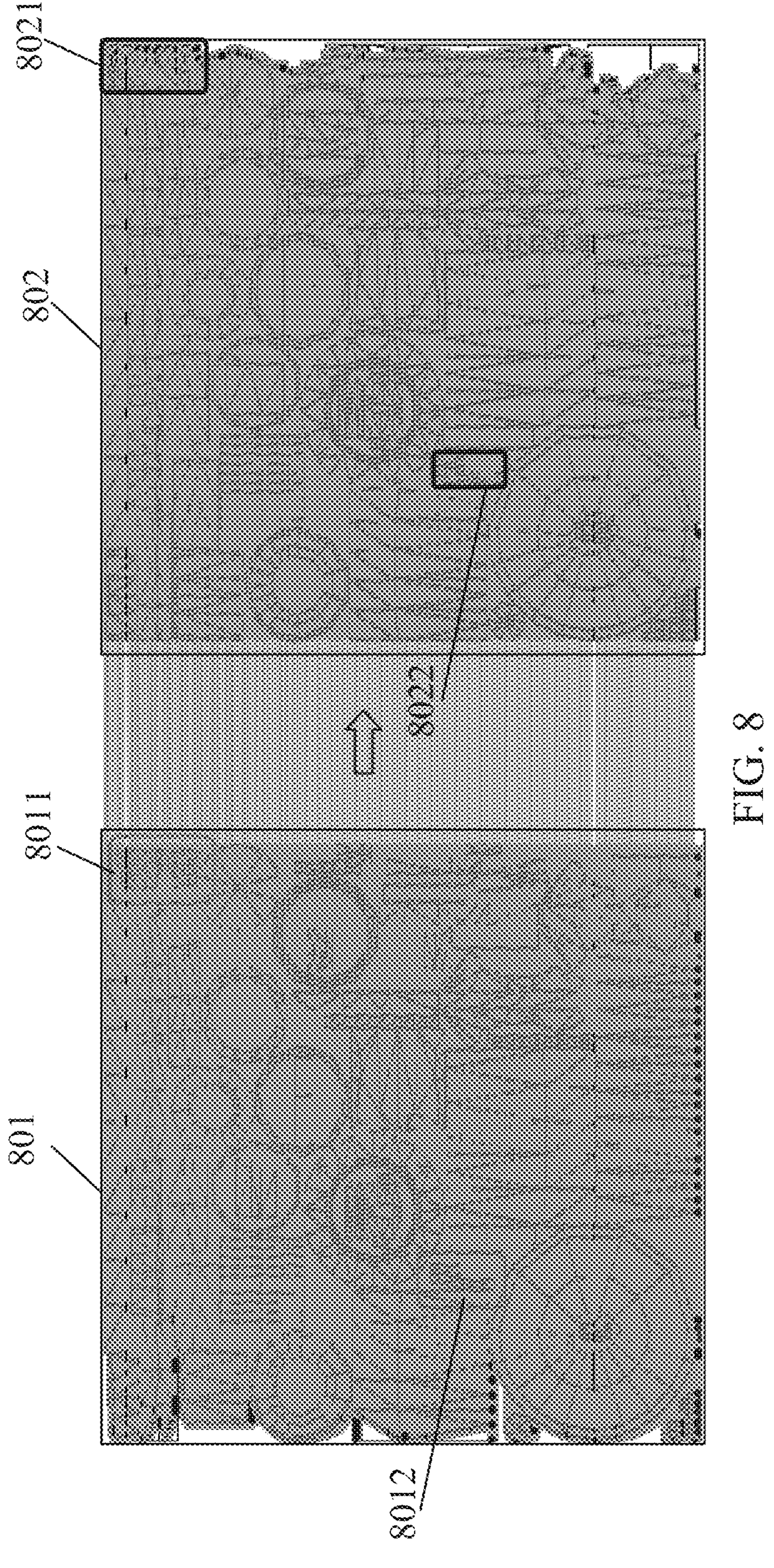
FIG. 8 is a schematic diagram of polygon classification and extension according to an embodiment of this application.

In this embodiment of this application, operations performed by art production persons are analyzed to extract ideas included in manual operations for designing a corresponding algorithm. An initial packing result 801 on the left of FIG. 8 is used as an example. An art production person moves UV islands so that spacings between different UV islands are roughly the same, and then classifies and extends different UV islands. For example, to maximize utilization of surrounding space of a UV island with an internal symmetry feature in a rectangular box 8011 on the upper right, the UV island is extended mostly in a vertical direction, and is also extended slightly in a horizontal direction. An extension result indicated by a rectangular box 8021 on the upper right of 802 in FIG. 8 is obtained. The anisotropic extension causes specific deformation but not texture distortion because the UV island is in a regular shape. A UV island without an internal symmetry feature in a rectangular box 8012 on the lower left is usually extended at equal ratios through isotropic extension to avoid texture distortion. An extension result indicated by a rectangular box 8022 on the lower left of 802 in FIG. 8 is obtained.

Figure 9:
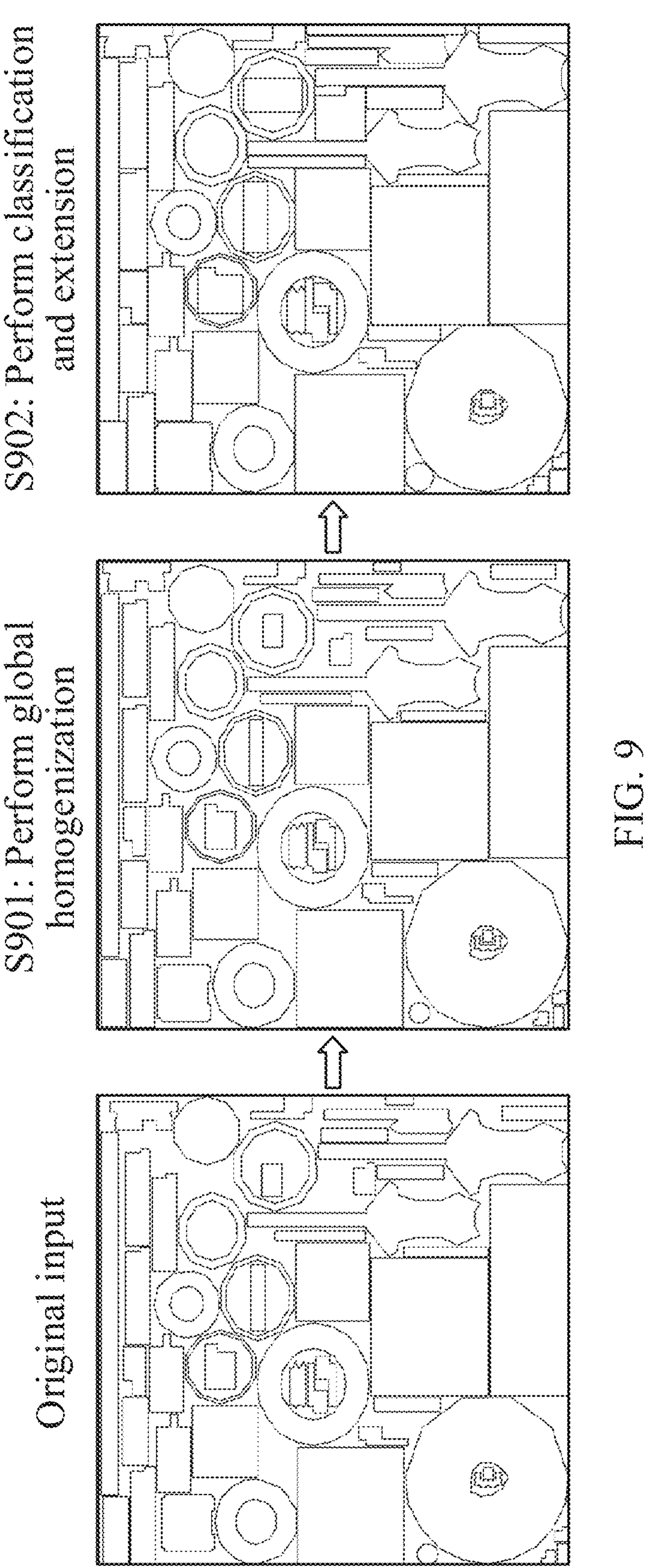
FIG. 9 is still another schematic implementation flowchart of an object processing method according to an embodiment of this application.

Based on the foregoing analysis, the object processing method provided in the embodiments of this application may be divided into two steps shown in FIG. 9 during implementation:

Step S901: Perform global homogenization.

In some embodiments, all UV islands are globally homogenized so that spacings between different UV islands are roughly the same.

Step S902: Perform classification and extension.

A UV island shown in FIG. 9 includes only outer boundaries and inner holes, and no longer includes inner edges of polygonal regions, because inner edges of a region do not affect a packing process or result. Therefore, to improve calculation efficiency, an outer contour (including an outer boundary and an inner hole) of each UV island is first extracted, and only the outer contour of each UV island is considered in subsequent packing optimization.

Implementation processes of step S901 and step S902 are described below.

1. Global Homogenization

Figure 10:
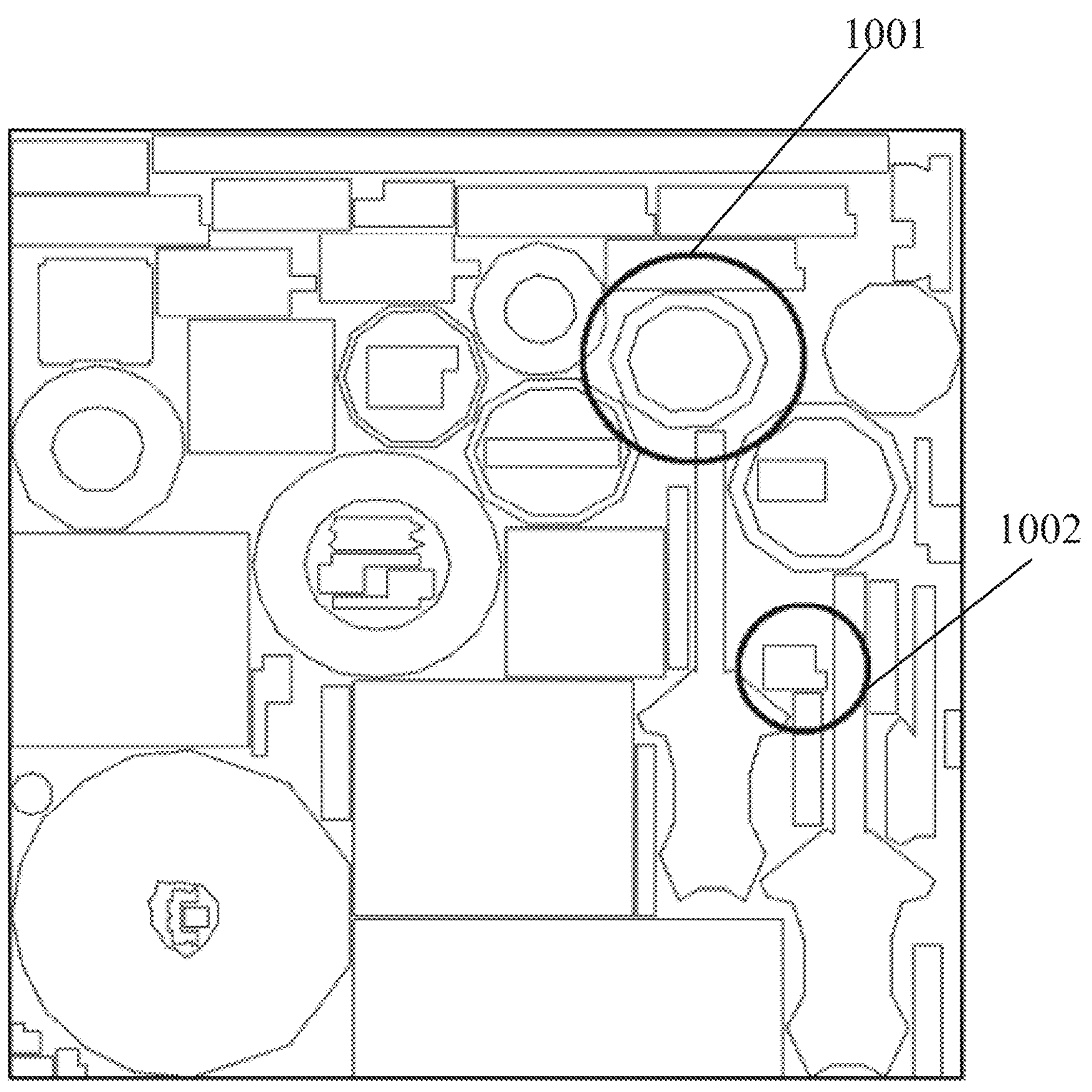
FIG. 10 is a schematic diagram of a UV island not located at a center of a local extension gap according to an embodiment of this application.

In a given packing result, a to-be-extended UV island is not necessarily at a center location of a gap in which the UV island is located, as indicated by UV islands in two circles 1001 and 1002 in FIG. 10. This causes impact on extension of the UV island. To minimize this impact, all UV islands need to be first globally "shaken", in other words, globally homogenized. A principle of global homogenization is as follows: It is assumed that a "virtual spring" exists in a gap between UV islands, and elasticity of the virtual spring causes the UV islands to move due to mutual repulsion to finally achieve a force balance. Based on this idea, global homogenization may be implemented by the following steps:

Step S9011: Define the maximum number P of iterations and the maximum number Q of movements of a single UV island based on the number of UV islands.

P is a positive integer, and Q is a positive integer less than or equal to P.

Step S9012: In the case of determining that the cumulative number of movements of each UV island is less than N, calculate a center point of a local gap in which the UV island is located, move the UV island so that a center point of a bounding box of the UV island coincides with the center point of the local gap, and update the cumulative number of movements of the UV island.

Step S9013: When no UV island is moved in step S9012, the algorithm ends.

During a movement iteration, when center points of bounding boxes of all UV islands are at centers of local gaps respectively corresponding to the UV islands, no UV island is moved in this iteration, and in this case, the global homogenization ends.

Step S9014: Update the current number of iterations. When the maximum number M of iterations is reached, the algorithm ends; otherwise, step S9012 is performed.

In this embodiment of this application, the maximum number Q of movements of a single UV island is defined because it is found in practice that cyclic movement causes a timeout in some cases. The maximum number P of iterations is defined because it is found that a plurality of iterations without clear effect are likely to occur and cause a final timeout when the maximum number of iterations is not defined when too many UV islands. In practice, to achieve an adaptive balance between efficiency and effectiveness, the following settings may be used: P=Q=8 when the number of UV islands is less than 10; P=Q=5 when the number of UV islands is less than 20; and P=Q=3 when the number of UV islands is greater than 20.

2. Classification and Extension

Figure 11:
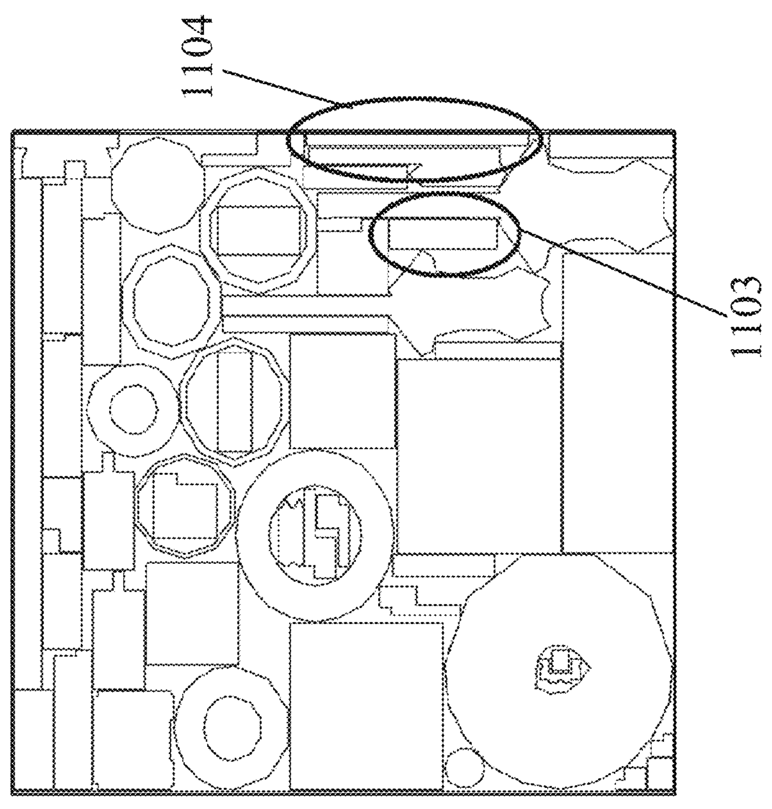
FIG. 11 is a schematic diagram of anisotropic extension according to an embodiment of this application.
Figure 11:
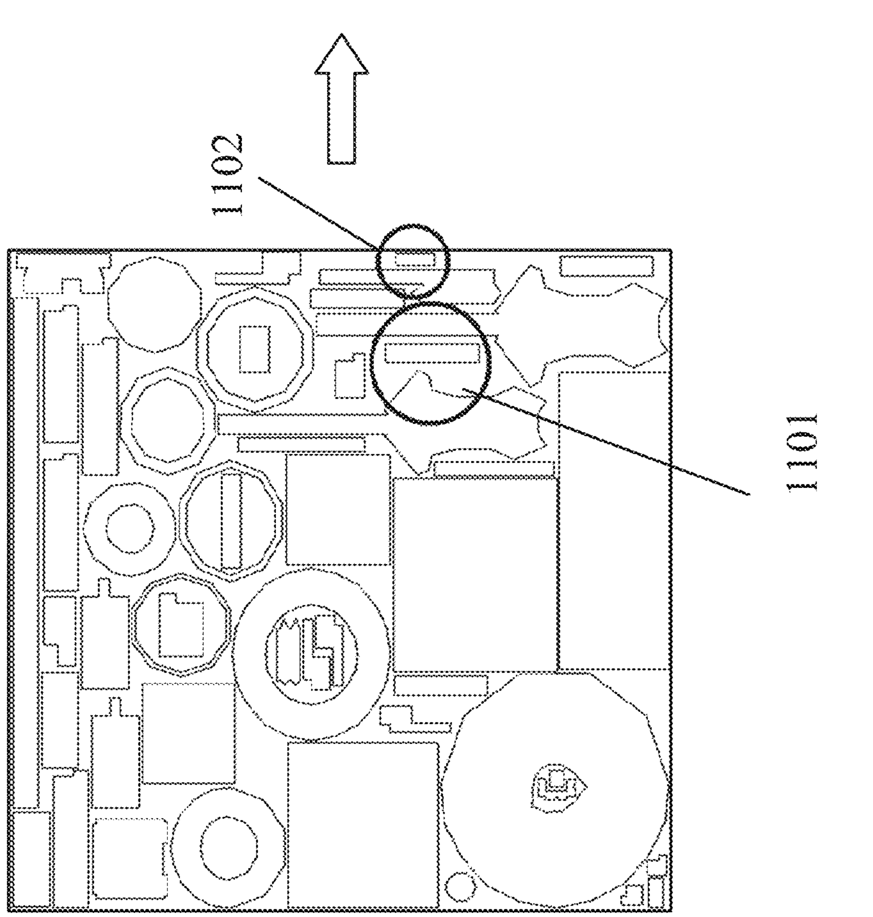

In applications similar to 2UV unwrapping, different UV islands usually have different extension requirements. For example, UV islands in circles 1101 and 1102 on the left of FIG. 11 have a significant internal symmetry feature. Therefore, different extension ratios are used for the UV islands in an x direction and a y direction without texture distortion. In this case, in this embodiment of this application, a principle is to extend the UV islands to the maximum extent to maximize a filling rate. This extension mode is referred to as the anisotropic extension. An obtained extension result is indicated by ellipses 1103 and 1104 on the right of FIG. 11.

Figure 12:
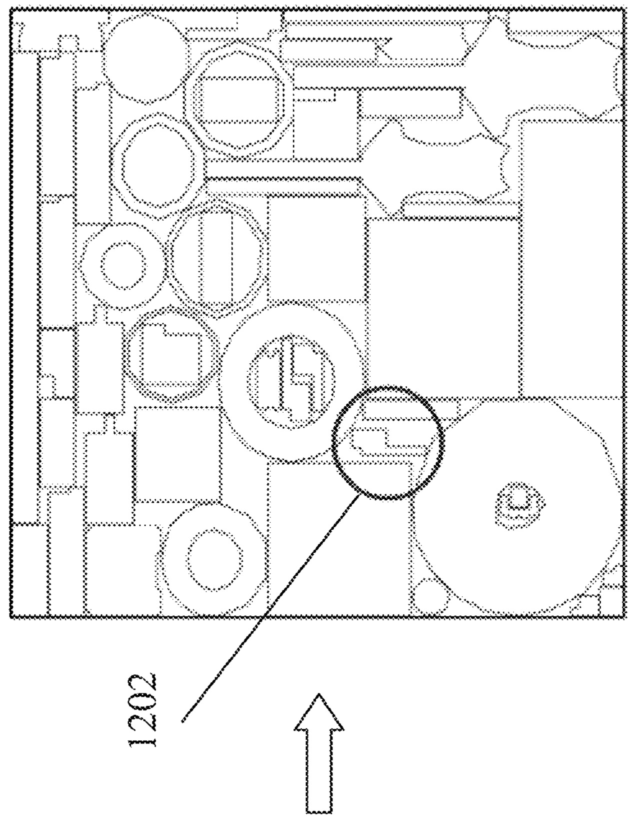
FIG. 12 is a schematic diagram of isotropic extension according to an embodiment of this application.
Figure 12:
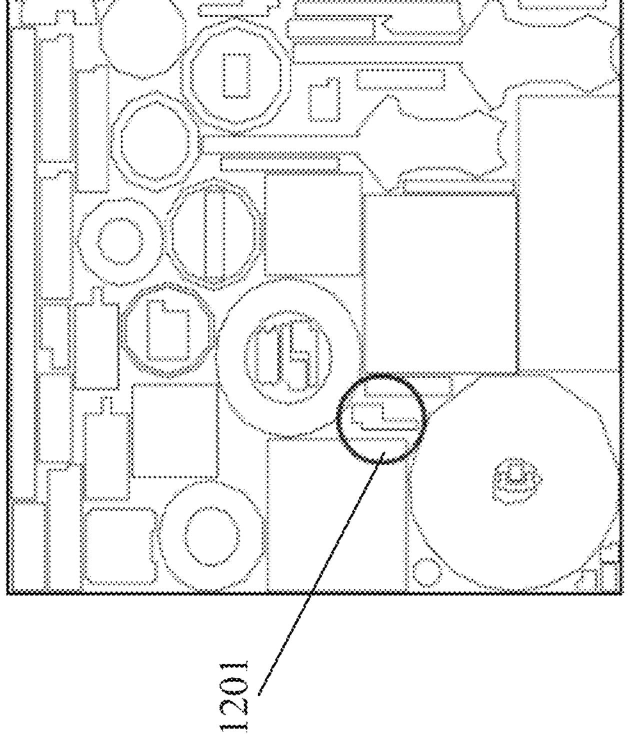

Anisotropic extension of a UV island without an internal symmetry feature, as indicated by a circle 1201 on the left of FIG. 12, is likely to cause texture distortion. In this case, a principle is to extend the UV island to the maximum extent while avoiding texture distortion. In this case, a same extension ratio needs to be used for the UV island in all directions. In this embodiment of this application, this extension mode is referred to as the isotropic extension, and an extension result is indicated by a circle 1202 on the right of FIG. 12.

The foregoing polygon classification is designed only for a specific requirement of 2UV unwrapping. For other requirements, different UV island classification may be designed, and different types of extension may be implemented.

A data structure, namely, an axis-aligned bounding box tree (AABB tree), for the isotropic extension and the anisotropic extension is described before implementation processes of the isotropic extension and the anisotropic extension are described. The AABB tree is a spatial search tree based on a principle of a K-d tree, and each node represents a spatial bounding box of a geometric primitive. The data structure can quickly report whether a queried primitive intersects with a primitive in the tree, and a specific intersection type and intersection location, and the like. When the queried primitive is a point, a minimum distance may be further queried.

In this embodiment of this application, edges of a polygon (with holes) are used for constructing a spatial search tree. Based on this data structure, classification and extension may be implemented by the following steps:

Step S9021: Record a set of UV islands included in a hole of each UV island.

Step S9022: Perform step S9023 for each UV island in ascending order to obtain an ascending-order extension result.

Step S9023: When a current to-be-extended UV island has an internal symmetry feature, perform anisotropic extension; otherwise, perform isotropic extension.

Step S9024: When a filling rate of the ascending-order extension result meets a requirement, the algorithm ends; otherwise, step S9025 is performed.

Step S9025: Perform step S9023 for each UV island in descending order to obtain a descending-order extension result.

Step S9026: Compare the ascending-order extension result with the descending-order extension result, and select one with a higher filling rate as a final extension result.

In this embodiment of this application, first, the set of UV islands included in the hole of each UV island is recorded in step S9021. A reason is as follows: When a hole of a current UV island includes another UV island, the UV island in the hole also needs to be simultaneously extended during extension. This can avoid overlapping with the UV island in the hole, and can also improve extension efficiency. The implementation processes of the anisotropic extension and the isotropic extension are described below.

Anisotropic extension: The anisotropic extension allows a UV island to have different extension ratios in different directions, so that the UV island can be independently extended in different directions. In this embodiment of this application, an implementation process of the anisotropic extension may include the following steps:

Step S231: Rotate all UV islands so that a principal axis of a current UV island is parallel to an x-axis, and record a rotational angle.

In some embodiments, a rotational angle and a rotation direction for rotating the principal axis to be parallel to the x-axis may be determined based on principal axis information of the current UV island, and then all the UV islands are rotated, so that the principal axis of the current UV island is parallel to the x-axis.

Step S232: Extract boundary segments of all UV islands outside the current UV island, and construct a corresponding spatial search tree T.

Step S233: Move the current UV island to a center of a local gap for the current UV island.

In some embodiments, a center of a bounding box of the current UV island is moved to the center of the local gap corresponding to the current UV island.

Step S234: Perform maximum extension through the following two steps in an up direction, a down direction, a left direction, and a right direction.

(A) Emit a ray outward from each candidate point on an outer boundary of the current UV island along a current direction, and calculate a closest intersection point by using the spatial search tree T, to determine a maximum extension ratio for outward extension of a current vertex (segment).

(B) Select a smallest one of all maximum extension ratios as a final extension ratio in the direction, and extend the UV island and all UV islands included in a hole of the UV island based on an opposite direction of the direction.

Step S235: Rotate all the UV islands back to original locations based on the rotational angle recorded in step S231.

Figure 13:
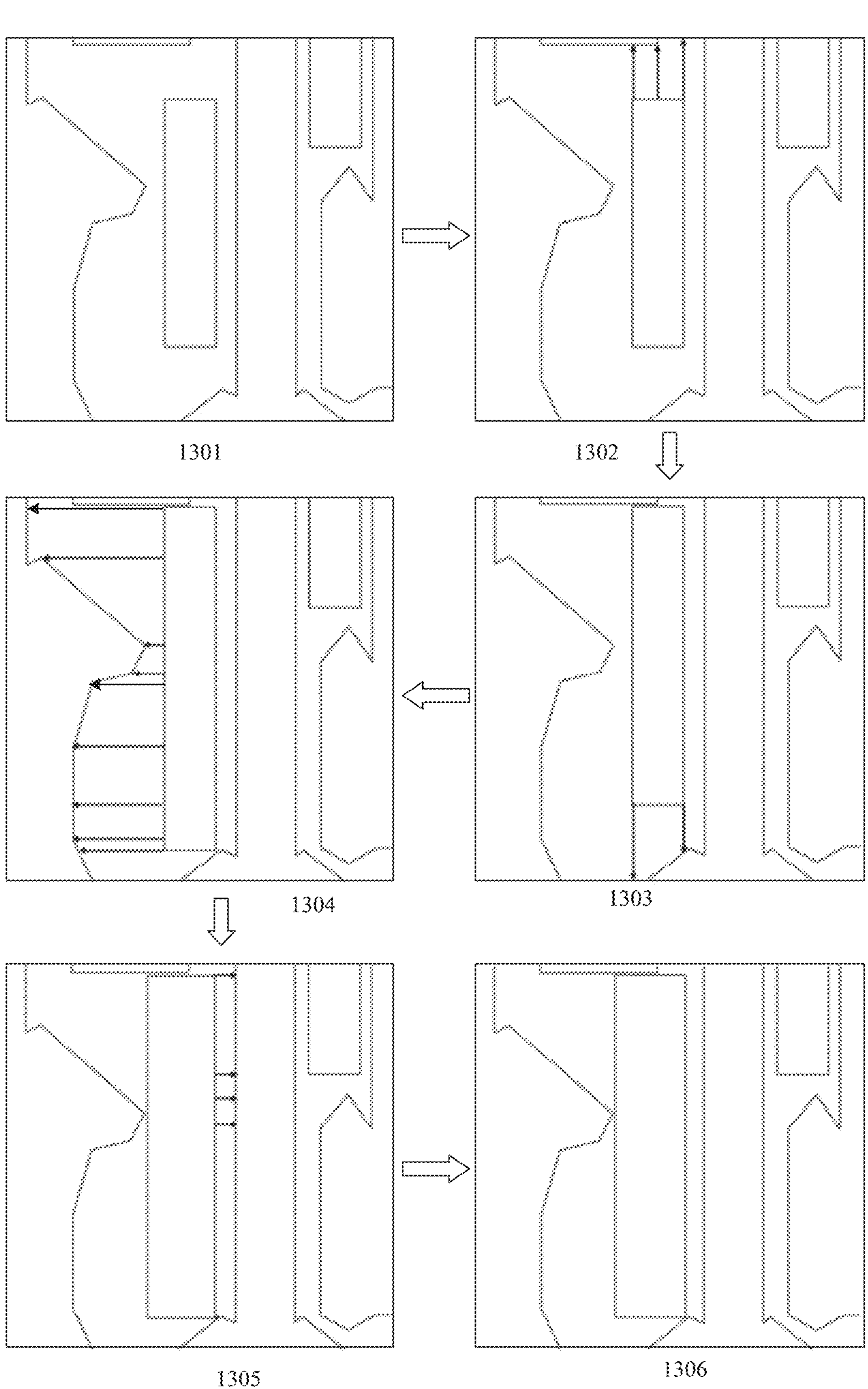
FIG. 13 is a schematic implementation flowchart of anisotropic extension according to an embodiment of this application.

FIG. 13 is a schematic implementation flowchart of anisotropic extension according to an embodiment of this application. 1301 in FIG. 13 is a part of an initial packing result, and a to-be-extended UV island is indicated by a rectangle in a center part of 1301. The to-be-extended UV island has an internal symmetry feature. Therefore, anisotropic extension is performed. During implementation, the to-be-extended UV island is extended upward, downward, leftward, and rightward. During upward extension, as shown in 1302 in FIG. 13, three points may be selected from an edge of an upper boundary of the rectangle as candidate points, and rays are emitted upward to determine an extension ratio for upward extension. During downward extension, as shown in 1303 in FIG. 13, two points may be selected from a lower boundary of the rectangle as candidate points, and rays are emitted downward to determine an extension ratio for downward extension. During leftward extension, as shown in 1304 in FIG. 13, nine candidate points may be selected from a left boundary of the rectangle, and rays are emitted to the left to determine an extension ratio for leftward extension. During rightward extension, as shown in 1305 in FIG. 13, five candidate points may be selected from a right boundary of the rectangle, and rays are emitted to the right to determine an extension ratio for rightward extension. After extension is performed in the up, down, left, and right directions, a final extension result shown in 1306 in a lower right corner of FIG. 13 can be obtained. It can be learned that, in this case, the original UV island is extended at different ratios in different directions, and is extended to the maximum extent.

Isotropic extension: To avoid texture distortion, isotropic extension is required for a UV island without an internal symmetry feature. In this embodiment of this application, an implementation process of the isotropic extension may be implemented by the following steps:

Step S241: Extract boundaries of all UV islands outside a current UV island, and construct a corresponding spatial search tree $T_1$.

Step S242: Move the current UV island to a center of a local gap for the current UV island.

Step S243: Extract a boundary of the current UV island, and construct a spatial search tree $T_2$ corresponding to the current UV island.

Step S244: Determine a maximum extension ratio by using a bidirectional ray method.

(A) Emit a ray outward from a center of the current UV island along a vertex of the boundary of the current UV island to obtain a closest intersection point with $T_1$, and calculate a corresponding extension ratio accordingly.

(B) Emit a ray from a vertex of a boundary of another UV island toward the center of the current UV island to obtain a closest intersection point with $T_2$, and calculate a corresponding extension ratio accordingly.

Step S245: Calculate a smallest one of all extension ratios obtained in step S244 as a final extension ratio, and then extend the current UV island and an island inside the current UV island at equal ratios through isotropic extension.

Figure 14:
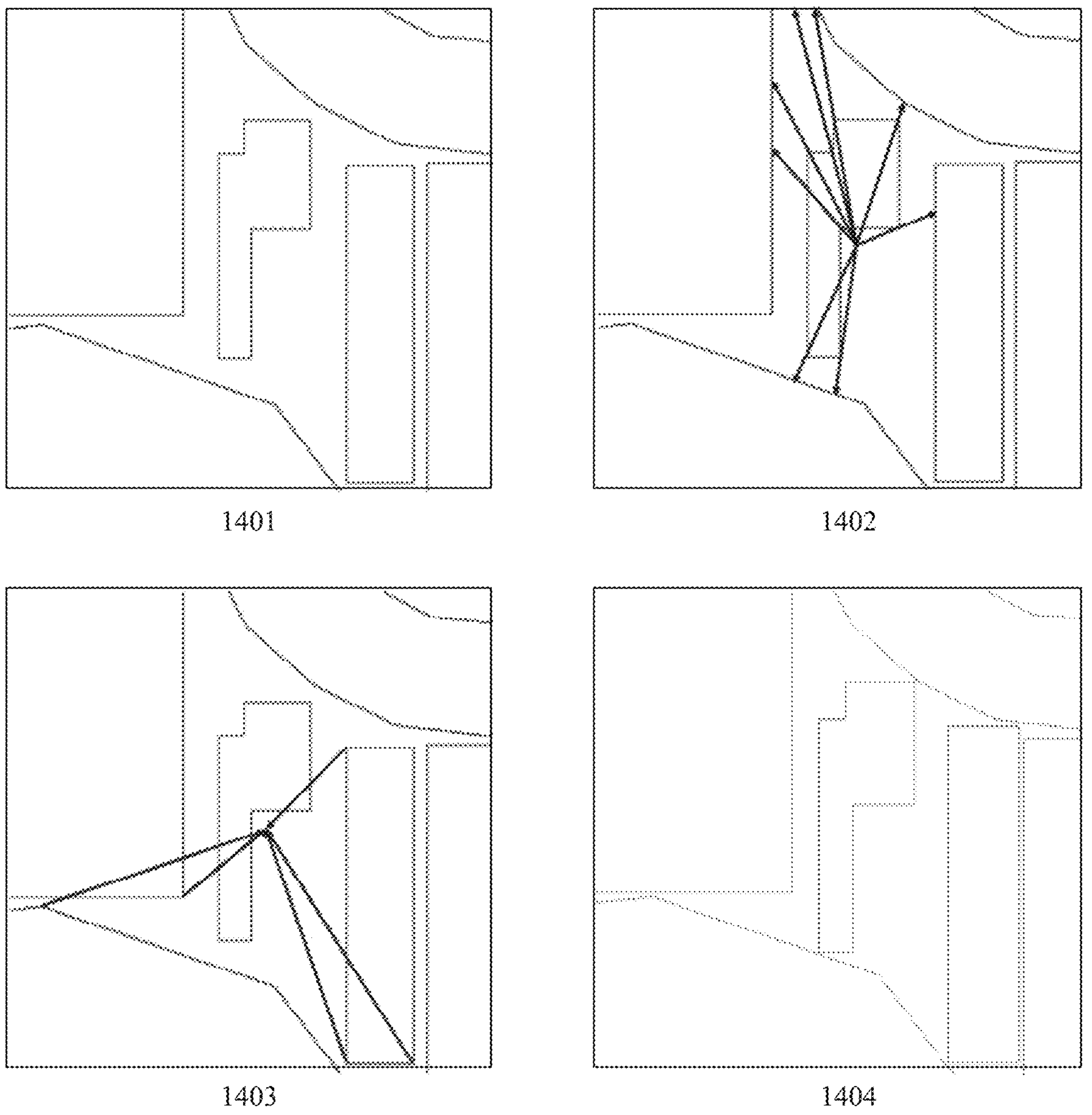
FIG. 14 is a schematic implementation flowchart of isotropic extension according to an embodiment of this application.

FIG. 14 is a schematic implementation flowchart of isotropic extension according to an embodiment of this application. In FIG. 14, 1401 shows an original to-be-extended UV island, 1402 shows some rays emitted outward, 1403 shows some rays emitted inward, and 1404 shows a final extension result. Each ray shown in 1402 and 1403 corresponds to an extension ratio. Therefore, provided that a smallest one of extension ratios corresponding to all rays is selected and a current UV island is extended accordingly, overlapping with a surrounding UV island can be avoided. In this case, the extension ratio is also a maximum ratio at which the UV island can be extended without overlapping with other UV island.

Art resources for an automatic 2UV unwrapping project usually include one or more groups of symmetric UV islands. Sometimes, a user expects to retain sizes of these symmetric UV islands during packing. Based on this, classification and extension may be implemented by the following steps:

Step S9021': Record a set of UV islands included in a hole of each UV island.

Step S9022': Extract symmetric UV islands, denote a set of symmetric UV islands as A, and denote a set of other asymmetric UV islands as B.

Step S9023': Perform the following steps for each group of symmetric UV islands in the set A:

(a) Move each UV island in the group of symmetric UV islands to a center of a local gap, and calculate a maximum extension ratio based on classification of the UV island.

(b) Obtain a smallest one of all extension ratios in (a) as a final extension ratio for the group of symmetric UV islands, and extend all symmetric UV islands in the group at equal ratios. When the extension causes overlapping, restore an original state.

Step S9024': Perform classification and extension for each asymmetric UV island in the set B still according to the method provided in step S9023.

In step S9021' to step S9024', classification and extension for symmetric UV islands are preferentially performed. A key herein lies in step S9023'. In this step, whether a current group of symmetric UV islands has an internal symmetry feature is first determined. When the current group of symmetric UV islands has an internal symmetry feature, a maximum extension ratio is calculated in an anisotropic mode; otherwise, a maximum extension ratio is calculated in an isotropic mode. After maximum extension ratios for all UV islands in the group are calculated, a smallest one of the maximum extension ratios is used as a final extension ratio, to avoid overlapping to the maximum extent. However, symmetric UV islands in one group may alternatively be adjacent to each other. Consequently, overlapping still occurs when extension at a minimum ratio. Therefore, checking is required after extension is actually performed. When overlapping is found, an original state is restored, and the group of symmetric UV islands is no longer extended. This can ensure that symmetric UV islands are extended at equal ratios, and therefore can meet a specific requirement of art production persons.

Figure 15:
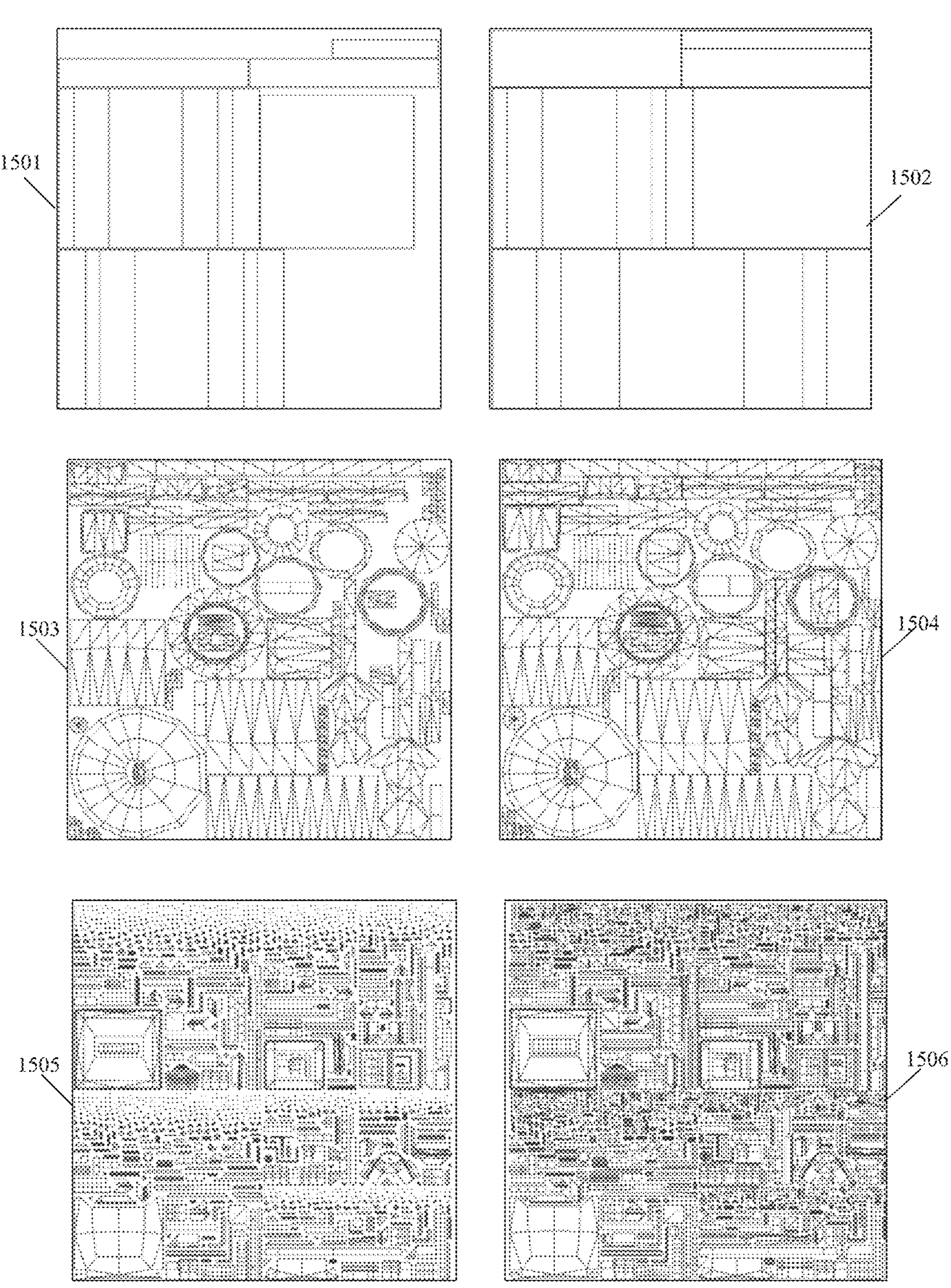
FIG. 15 is a diagram of comparison between packing results obtained before and after a small-sized UV island, a medium-sized UV island, and a large-sized UV island are extended according to an embodiment of this application.

A small-sized UV island, a medium-sized UV island, and a large-sized UV island are separately tested by using the model processing method provided in the embodiments of this application, and extended results shown in FIG. 15 are obtained. In FIG. 15, 1501, 1503, and 1505 show packing effect of the small-sized UV island, the medium-sized UV island, and the large-sized UV island respectively before the extension; and 1502, 1504, and 1506 show packing effect of the small-sized UV island, the medium-sized UV island, and the large-sized UV island respectively after the extension. It can be learned through comparison that a filling rate of packing is maximized after polygon classification and extension, and isotropic/anisotropic features of the UV islands are also well retained. These two aspects well adapt to requirements of art production persons in 2UV unwrapping.

To further verify an increase in a filling rate in an automatic 2UV unwrapping project according to the model processing method provided in the embodiments of this application, batch tests are performed on art resources for 14 projects of a gaming company, and statistical results shown in Table 1 are obtained. Names of the art resources are replaced with A, B, . . . , and N respectively.

TABLE 1

Statistical comparison with beneficial effect of the polygon classification and extension algorithm

| Indicator | Art resources: A | B | C | D | E | F | G | H | I | J | K | L | M | N |
|---|---|---|---|---|---|---|---|---|---|---|---|---|---|---|
| Total number of resources | 1440 | 851 | 138 | 388 | 46 | 449 | 197 | 50 | 77 | 450 | 789 | 219 | 48 | 17 |
| Manual filling rate | 0.62 | 0.64 | 0.60 | 0.78 | 0.69 | 0.62 | 0.72 | 0.67 | 0.74 | 0.61 | 0.81 | 0.73 | 0.64 | 0.67 |
| Filling rate before extension | 0.60 | 0.60 | 0.60 | 0.63 | 0.63 | 0.69 | 0.63 | 0.63 | 0.61 | 0.60 | 0.66 | 0.67 | 0.63 | 0.59 |
| Filling rate after extension | 0.73 | 0.76 | 0.68 | 0.77 | 0.74 | 0.79 | 0.77 | 0.75 | 0.78 | 0.73 | 0.89 | 0.83 | 0.72 | 0.66 |
| Improvement ratio of the filling rate | 0.13 | 0.16 | 0.08 | 0.14 | 0.11 | 0.10 | 0.14 | 0.12 | 0.17 | 0.13 | 0.23 | 0.16 | 0.09 | 0.07 |
| Proportion of exceeding the manual filling rate before extension | 48.8% | 42.3% | 51.9% | 19.5% | 26.3% | 66.2% | 26.8% | 46.7% | 17.9% | 48.3% | 19.4% | 38.8% | 52.6% | 16.7% |
| Proportion of exceeding the manual filling rate after extension | 79.6% | 81.0% | 88.3% | 50.5% | 73.7% | 86.3% | 62.1% | 80.0% | 67.6% | 87.5% | 69.6% | 85.2% | 76.3% | 33.3% |
| Improvement ratio of the proportion of exceeding the manual filling rate | 20.8% | 38.7% | 36.4% | 31.0% | 47.4% | 20.1% | 35.3% | 33.3% | 49.7% | 39.2% | 50.2% | 46.4% | 23.7% | 16.6% |

It can be learned from Table 1 that the filling rate is increased by 10% to 15% after polygon classification and extension are performed. In particular, an average filling rate without polygon classification and extension is usually lower than that of a manual packing result; however, after polygon extension is performed, an average filling rate of an automatic packing result exceeds a manual filling rate, except in the project D. Table 1 also shows that the proportion of a packing filling rate exceeding a manual filling rate can be increased by approximately 30% on average after polygon classification and extension are performed.

The following further describes an exemplary structure of the object processing apparatus 455 provided in the embodiments of this application when the apparatus is implemented as software modules. In some embodiments, as shown in FIG. 3, software modules of the object processing apparatus 455 that are stored in the memory 450 may include:

the first obtaining module 4551, configured to obtain an initial filling result of a plurality of resource objects in a target container;

the first moving module 4552, configured to move, based on the initial filling result, each resource object to a center location of an available space corresponding to the resource object;

the second obtaining module 4553, configured to obtain symmetry attribute information and inclusion relationship information of each resource object;

the first determining module 4554, configured to determine an extension type of each resource object based on the symmetry attribute information and the inclusion relationship information of each resource object, the extension type including one of isotropic extension and anisotropic extension; and the first extension module 4555, configured to extend each resource object based on the extension type of each resource object to obtain each processed resource object.

In some embodiments, the first moving module is further configured to:

obtain a preset movement iteration count threshold and a movement count threshold for a single resource object;

obtain the current number of movement iterations, and when the current number of movement iterations is less than the movement iteration count threshold, obtain the current number of movements of an $i^{th}$ resource object, i=1, 2, . . . , N, N being the total number of resource objects, and N being an integer greater than 2;

when the current number of movements of the $i^{th}$ resource object is less than the movement count threshold, determine movement information for moving an object center of the $i^{th}$ resource object to a center location of an available space in which the $i^{th}$ resource object is located; and when determining, based on the movement information, that a movement distance of the $i^{th}$ resource object is greater than a preset distance threshold, move the object center of the $i^{th}$ resource object to the center location of the available space, and update the current number of movements of the $i^{th}$ resource object.

In some embodiments, the apparatus further includes:

a first update module, configured to: after a current movement iteration process of the first resource object to an $N^{th}$ resource object is completed, update the current number of movement iterations to obtain an updated current number of movement iterations; and a second moving module, configured to: when determining that the updated current number of movement iterations is less than the movement iteration count threshold, continue to move the first resource object to the $N^{th}$ resource object.

In some embodiments, the first determining module is further configured to:

when symmetry attribute information of an $i^{th}$ resource object represents that the $i^{th}$ resource object has an internal symmetry feature, and when determining, based on inclusion relationship information of the $i^{th}$ resource object, that the $i^{th}$ resource object is not included in a parent resource object, determine that an extension type of the $i^{th}$ resource object is the anisotropic extension, i=1, 2, . . . , N, N being the total number of resource objects, and N being an integer greater than 2.

In some embodiments, the first determining module is further configured to:

when the symmetry attribute information of the $i^{th}$ resource object represents that the $i^{th}$ resource object does not have an internal symmetry feature, determine that the extension type of the $i^{th}$ resource object is the isotropic extension.

In some embodiments, the first determining module is further configured to:

when the $i^{th}$ resource object is included in a parent resource object, obtain an extension type of the parent resource object; and when the extension type of the parent resource object is the isotropic extension, determine that the extension type of the $i^{th}$ resource object is the isotropic extension.

In some embodiments, the first determining module is further configured to:

when the extension type of the parent resource object is the anisotropic extension, obtain other resource subobjects included in the parent resource object; and when determining, based on symmetry attribute information of the other resource subobjects, that all the other resource subobjects have an internal symmetry feature, determine that the extension type of the $i^{th}$ resource object is the anisotropic extension; or when determining, based on the symmetry attribute information of the other resource subobjects, that at least one of the other resource subobjects does not have an internal symmetry feature, determine that the extension type of the $i^{th}$ resource object is the isotropic extension.

In some embodiments, the first extension module is further configured to:

when determining that the target container does not include a symmetric object of an $i^{th}$ resource object and an extension type of the $i^{th}$ resource object is the isotropic extension, determine a first extension ratio for the $i^{th}$ resource object, i=1, 2, . . . , N, N being the total number of resource objects, and N being an integer greater than 2; and when determining, based on inclusion relationship information of the $i^{th}$ resource object, that the $i^{th}$ resource object includes another resource subobject, extend the $i^{th}$ resource object and the another resource subobject included in the $i^{th}$ resource object based on the first extension ratio to obtain a processed $i^{th}$ resource object and processed another resource subobject.

In some embodiments, the first extension module is further configured to:

obtain outer boundary information of another resource object outside the $i^{th}$ resource object, outer boundary information of the $i^{th}$ resource object, and an object center of the $i^{th}$ resource object;

emit a first ray from the object center of the $i^{th}$ resource object to each first vertex on an outer boundary of the $i^{th}$ resource object, and determine each first closest intersection point between each first ray and an outer boundary of the another resource object;

determine a first candidate extension ratio corresponding to each first vertex based on center coordinates of the object center, first vertex coordinates of each first vertex, and first intersection point coordinates of each first closest intersection point;

emit a second ray from each second vertex on the outer boundary of the another resource object to the object center of the $i^{th}$ resource object, and determine each second closest intersection point between each second ray and the outer boundary of the $i^{th}$ resource object;

determine a second candidate extension ratio corresponding to each second vertex based on center coordinates of the object center, second vertex coordinates of each second vertex, and second intersection point coordinates of each second closest intersection point; and determine a smallest one of a plurality of first candidate extension ratios and a plurality of second candidate extension ratios as the first extension ratio for the $i^{th}$ resource object.

In some embodiments, the first extension module is further configured to:

obtain a preset spacing distance, and determine, based on the spacing distance and the intersection point coordinates of each first closest intersection point, first target coordinates of a first target point corresponding to each first closest intersection point;

determine a first distance corresponding to each first vertex based on the center coordinates of the object center and the first vertex coordinates of each first vertex;

determine a second distance corresponding to each first vertex based on the center coordinates of the object center and first target coordinates of each first target point; and determine the first candidate extension ratio corresponding to each first vertex based on the first distance and the second distance that correspond to each first vertex.

In some embodiments, the first extension module is further configured to:

when an extension type of an $i^{th}$ resource object is anisotropic extension, obtain principal axis information of the $i^{th}$ resource object, and determine a rotational angle and a first rotation direction based on the principal axis information of the $i^{th}$ resource object, $i=1, 2, \ldots, N$, N being the total number of resource objects, and N being an integer greater than 2;

rotate N resource objects in the first rotation direction by the rotational angle to obtain N rotated resource objects, a principal axis of a rotated $i^{th}$ resource object being in a horizontal direction;

move an object center of the rotated $i^{th}$ resource object to a center location of a corresponding available space;

determine a second extension ratio for the rotated $i^{th}$ resource object in each preset extension direction;

when determining, based on inclusion relationship information of the rotated $i^{th}$ resource object, that the rotated $i^{th}$ resource object includes another resource subobject, extend the rotated $i^{th}$ resource object and the another resource subobject included in the rotated $i^{th}$ resource object in each extension direction based on a corresponding second extension ratio to obtain an extended $i^{th}$ resource object and extended another resource subobject; and rotate the extended $i^{th}$ resource object and the extended another resource subobject in a second rotation direction by the rotational angle to obtain a processed $i^{th}$ resource object and processed another resource subobject, the second rotation direction being an opposite direction of the first rotation direction.

In some embodiments, the first extension module is further configured to:

obtain outer boundary information of another resource object outside the rotated $i^{th}$ resource object and a bounding box of the rotated $i^{th}$ resource object;

determine a plurality of candidate points corresponding to a $j^{th}$ extension direction from an outer boundary of the rotated $i^{th}$ resource object;

emit a third ray from each candidate point along the $j^{th}$ extension direction, and determine a third closest intersection point between each third ray and an outer boundary of the another resource object;

determine each third distance from each candidate point to a target edge of the bounding box, and determine each fourth distance from each third closest intersection point to the target edge, the target edge being an edge of the bounding box that corresponds to an opposite direction of the $j^{th}$ extension direction;

determine a third candidate extension ratio corresponding to each candidate point based on each third distance and each corresponding fourth distance; and determine a smallest one of a plurality of third candidate extension ratios as a second extension ratio in the $j^{th}$ extension direction.

In some embodiments, the apparatus further includes:

a second determining module, configured to: when determining that the target container includes a symmetric object of an $i^{th}$ resource object, separately determine a first reference extension ratio for the $i^{th}$ resource object and a second reference extension ratio for the symmetric object based on an extension type of the $i^{th}$ resource object;

a third determining module, configured to determine a smaller one of the first reference extension ratio and the second reference extension ratio as a target extension ratio for the $i^{th}$ resource object and the symmetric object; and a second extension module, configured to extend the $i^{th}$ resource object and the symmetric object based on the target extension ratio to obtain a processed $i^{th}$ resource object and a processed symmetric object.

In some embodiments, the apparatus further includes:

a fourth determining module, configured to determine a first filling rate of the target container after the first resource object to the $N^{th}$ resource object are extended;

a third extension module, configured to: when determining that the first filling rate is less than a preset filling rate threshold, sequentially extend the $N^{th}$ resource object to the first resource object based on an extension type corresponding to each resource object, to obtain a secondary-processed $N^{th}$ resource object to a secondary-processed first resource object;

a fifth determining module, configured to determine a second filling rate of the target container; and a sixth determining module, configured to: when the second filling rate is greater than the first filling rate, determine the secondary-processed $N^{th}$ resource object to the secondary-processed first resource object as a target extension result.

The descriptions of the object processing apparatus in this embodiment of this application are similar to the descriptions of the foregoing method embodiments, and the apparatus has beneficial effect similar to that of the method embodiments. For technical details not disclosed in this apparatus embodiment, refer to the descriptions of the method embodiments of this application for understanding.

An embodiment of this application provides a computer program product or a computer program. The computer program product or the computer program includes computer instructions, and the computer instructions are stored in a non-transitory computer-readable storage medium. A processor of a computer device reads the computer instructions from the computer-readable storage medium, and the processor executes the computer instructions, so that the computer device performs the object processing method in the embodiments of this application.

An embodiment of this application provides a non-transitory computer-readable storage medium, having executable instructions stored therein. When the executable instructions are executed by a processor of a computer device, the computer device is enabled to perform the object processing method provided in the embodiments of this application, for example, the object processing method shown in FIG. 4A, FIG. 4B, FIG. 5, or FIG. 6.

In some embodiments, the computer-readable storage medium may be a memory such as a FRAM, a ROM, a PROM, an EPROM, an EEPROM, a flash memory, a magnetic surface memory, a compact disc, or a CD-ROM; or may be various devices including one of or any combination of the foregoing memories.

In some embodiments, the executable instructions may be written in a form of a program, software, a software module, a script, or code based on a programming language in any form (including a compiled or interpretive language, or a declarative or procedural language), and may be deployed in any form, including being deployed as a standalone program, or being deployed as a module, a component, a subroutine, or another unit suitable for use in a computing environment.

In an example, the executable instructions may, but not necessarily, correspond to a file in a file system, and may be stored as a part of a file that stores other programs or data, for example, stored in one or more scripts of a Hypertext Markup Language (HTML) document, stored in a single file dedicated for the discussed program, or stored in a plurality of co-files (for example, files that store one or more modules, subroutines, or code parts).

In an example, the executable instructions may be deployed on one computing device for execution, or may be executed on a plurality of computing devices at one location, or may be executed on a plurality of computing devices that are distributed at a plurality of locations and that are interconnected through a communication network.

The foregoing descriptions are merely embodiments of this application and are not intended to limit the protection scope of this application. Any modification, equivalent replacement, or improvement made without departing from the spirit and scope of this application shall fall within the protection scope of this application. In this application, the term "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module.

What is claimed is:

1. A map rendering method performed by a computer device, the method comprising:

obtaining an initial filling result of a plurality of resource objects in a target container;

moving, based on the initial filling result, at least one resource object to a center location of an available space corresponding to the resource object in the target container;

obtaining symmetry attribute information and inclusion relationship information of the at least one resource object;

determining an extension type of the at least one resource object based on the symmetry attribute information and the inclusion relationship information of the at least one resource object; and extending the at least one resource object in the target container based on the extension type of the at least one resource object.

2. The method according to claim 1, wherein the moving, based on the initial filling result, at least one resource object to a center location of an available space corresponding to the resource object in the target container comprises:

determining movement information for moving an object center of the at least one resource object to a center location of the available space in which the at least one resource object is located; and when determining, based on the movement information, that a movement distance of the at least one resource object is greater than a preset distance threshold, moving the object center of the at least one resource object to the center location of the available space.

3. The method according to claim 1, wherein the extension type of the at least one resource object is one of isotropic extension and anisotropic extension.

4. The method according to claim 1, wherein the determining an extension type of the at least one resource object based on the symmetry attribute information and the inclusion relationship information of the at least one resource object comprises:

when the symmetry attribute information of the at least one resource object represents that the at least one resource object does not have an internal symmetry feature, determining that the extension type of the $i^{th}$ resource object is isotropic extension.

5. The method according to claim 1, wherein the determining an extension type of the at least one resource object based on the symmetry attribute information and the inclusion relationship information of the at least one resource object comprises:

when the symmetry attribute information of the at least one resource object represents that the at least one resource object has an internal symmetry feature, and the inclusion relationship information of the at least one resource object represents that the at least one resource object is not within a parent resource object, determining that an extension type of the at least one resource object is anisotropic extension.

6. The method according to claim 5, wherein the determining an extension type of the at least one resource object based on the symmetry attribute information and the inclusion relationship information of the at least one resource object comprises:

when the at least one resource object is within a parent resource object, obtaining an extension type of the parent resource object as the extension type of the at least one resource object.

7. The method according to claim 1, wherein the extending the at least one resource object in the target container based on the extension type of the at least one resource object comprises:

when determining that the target container does not comprise a symmetric object of the at least one resource object and an extension type of the at least one resource object is isotropic extension, determining a first extension ratio for the at least one resource object; and extending the at least one resource object based on the first extension ratio.

8. The method according to claim 1, wherein the method further comprises:

when determining that the target container does not comprise a symmetric object of the at least one resource object, separately determining a first reference extension ratio for the at least one resource object and a second reference extension ratio for the symmetric object based on an extension type of the at least one resource object; and extending the at least one resource object and the symmetric object based on a smaller one of the first reference extension ratio and the second reference extension ratio.

9. A computer device, comprising:

a memory, configured to store executable instructions; and a processor, configured to implement a map rendering method when executing the executable instructions stored in the memory, the method including:

obtaining an initial filling result of a plurality of resource objects in a target container;

moving, based on the initial filling result, at least one resource object to a center location of an available space corresponding to the resource object in the target container;

obtaining symmetry attribute information and inclusion relationship information of the at least one resource object;

determining an extension type of the at least one resource object based on the symmetry attribute information and the inclusion relationship information of the at least one resource object; and extending the at least one resource object in the target container based on the extension type of the at least one resource object.

10. The computer device according to claim 9, wherein the moving, based on the initial filling result, at least one resource object to a center location of an available space corresponding to the resource object in the target container comprises:

determining movement information for moving an object center of the at least one resource object to a center location of the available space in which the at least one resource object is located; and when determining, based on the movement information, that a movement distance of the at least one resource object is greater than a preset distance threshold, moving the object center of the at least one resource object to the center location of the available space.

11. The computer device according to claim 9, wherein the extension type of the at least one resource object is one of isotropic extension and anisotropic extension.

12. The computer device according to claim 9, wherein the determining an extension type of the at least one resource object based on the symmetry attribute information and the inclusion relationship information of the at least one resource object comprises:

when the symmetry attribute information of the at least one resource object represents that the at least one resource object does not have an internal symmetry feature, determining that the extension type of the $i^{th}$ resource object is isotropic extension.

13. The computer device according to claim 9, wherein the determining an extension type of the at least one resource object based on the symmetry attribute information and the inclusion relationship information of the at least one resource object comprises:

when the symmetry attribute information of the at least one resource object represents that the at least one resource object has an internal symmetry feature, and the inclusion relationship information of the at least one resource object represents that the at least one resource object is not within a parent resource object, determining that an extension type of the at least one resource object is anisotropic extension.

14. The computer device according to claim 13, wherein the determining an extension type of the at least one resource object based on the symmetry attribute information and the inclusion relationship information of the at least one resource object comprises:

when the at least one resource object is within a parent resource object, obtaining an extension type of the parent resource object as the extension type of the at least one resource object.

15. The computer device according to claim 9, wherein the extending the at least one resource object in the target container based on the extension type of the at least one resource object comprises:

when determining that the target container does not comprise a symmetric object of the at least one resource object and an extension type of the at least one resource object is isotropic extension, determining a first extension ratio for the at least one resource object; and extending the at least one resource object based on the first extension ratio.

16. The computer device according to claim 9, wherein the method further comprises:

when determining that the target container does not comprise a symmetric object of the at least one resource object, separately determining a first reference extension ratio for the at least one resource object and a second reference extension ratio for the symmetric object based on an extension type of the at least one resource object; and extending the at least one resource object and the symmetric object based on a smaller one of the first reference extension ratio and the second reference extension ratio.

17. A non-transitory computer-readable storage medium, having executable instructions stored therein, the executable instructions, when executed by a processor of a computer device, cause the computer device to implement a map rendering method, the method including:

obtaining an initial filling result of a plurality of resource objects in a target container;

moving, based on the initial filling result, at least one resource object to a center location of an available space corresponding to the resource object in the target container;

obtaining symmetry attribute information and inclusion relationship information of the at least one resource object;

determining an extension type of the at least one resource object based on the symmetry attribute information and the inclusion relationship information of the at least one resource object; and extending the at least one resource object in the target container based on the extension type of the at least one resource object.

18. The non-transitory computer-readable storage medium according to claim 17, wherein the moving, based on the initial filling result, at least one resource object to a center location of an available space corresponding to the resource object in the target container comprises:

determining movement information for moving an object center of the at least one resource object to a center location of the available space in which the at least one resource object is located; and when determining, based on the movement information, that a movement distance of the at least one resource object is greater than a preset distance threshold, moving the object center of the at least one resource object to the center location of the available space.

19. The non-transitory computer-readable storage medium according to claim 17, wherein the extension type of the at least one resource object is one of isotropic extension and anisotropic extension.

20. The non-transitory computer-readable storage medium according to claim 17, wherein the determining an extension type of the at least one resource object based on the symmetry attribute information and the inclusion relationship information of the at least one resource object comprises:

when the symmetry attribute information of the at least one resource object represents that the at least one resource object does not have an internal symmetry feature, determining that the extension type of the $i^{th}$ resource object is isotropic extension.

* * * * *